US010992698B2

(12) United States Patent
Patel et al.

(10) Patent No.: US 10,992,698 B2
(45) Date of Patent: Apr. 27, 2021

(54) DEVICE VULNERABILITY MANAGEMENT

(71) Applicant: MEDITECHSAFE, INC., West Chester, OH (US)

(72) Inventors: Pranav N. Patel, West Chester, OH (US); Ramakrishnan Ayyappan Pillai, San Jose, CA (US)

(73) Assignee: MEDITECHSAFE, INC., West Chester, OH (US)

( * ) Notice: Subject to any disclaimer, the term of this patent is extended or adjusted under 35 U.S.C. 154(b) by 381 days.

(21) Appl. No.: 15/897,535

(22) Filed: Feb. 15, 2018

(65) Prior Publication Data

US 2018/0351987 A1 Dec. 6, 2018

Related U.S. Application Data

(60) Provisional application No. 62/514,956, filed on Jun. 5, 2017.

(51) Int. Cl.
  *H04L 29/06* (2006.01)
  *G06F 8/65* (2018.01)
  (Continued)

(52) U.S. Cl.
  CPC ............ *H04L 63/1433* (2013.01); *G06F 8/65* (2013.01); *G06F 16/951* (2019.01); *G06F 21/577* (2013.01)

(58) Field of Classification Search
  CPC .............. H04L 63/1433; H04L 9/3247; H04L 16/1425; H04L 63/1416; H04L 63/1441;
  (Continued)

(56) References Cited

U.S. PATENT DOCUMENTS 7,890,869 B1 * 2/2011 Mayer .................. G06F 21/577
  709/224
8,495,747 B1 * 7/2013 Nakawatase .......... G06F 21/577
  726/25

(Continued)

OTHER PUBLICATIONS

Denise Anderson and Dale Nordenberg; "The Next Frontier in Medical Device Security"; HIMSS Annual Conference & Exhibition; Orlando, Florida; Feb. 2017.

(Continued)

*Primary Examiner* — Lynn D Feild
*Assistant Examiner* — Richard A McCoy
(74) *Attorney, Agent, or Firm* — Thomas E. Lees, LLC

(57) ABSTRACT

A computer-implemented process of remediating device security vulnerabilities is carried out by determining identifications of electronic devices associated with an entity and calculating, for each device, a security cyber-vulnerability score. For instance, the cyber-vulnerability score is calculated by generating a device cyber-vulnerability score based upon known threats and vulnerabilities, generating a device level cyber-vulnerability score by augmenting the generated device cyber-vulnerability score based upon at least one device level parameter, generating an environmental cyber-vulnerability score, and computing an overall cyber-vulnerability score based upon the device level cyber-vulnerability score and the environmental cyber-vulnerability score. The computer-implemented process also comprises prioritizing the electronic devices based upon the computed overall cyber-vulnerability score, identifying whether a patch is available for at least one electronic device, and initiating a remediation/mitigation workflow to patch at least one electronic device.

16 Claims, 9 Drawing Sheets

(51) Int. Cl.
*G06F 16/951* (2019.01)
*G06F 21/57* (2013.01)

(58) Field of Classification Search
CPC ...... G06F 21/577; G06F 21/64; G06F 21/645;
G06F 21/554; G06F 21/55; G06F 21/552;
G06F 21/57; G06Q 10/0635; G06Q
10/103; G06Q 10/06
See application file for complete search history.

(56) References Cited

U.S. PATENT DOCUMENTS

| | | | | |
|---|---|---|---|---|
| 8,739,290 | B1* | 5/2014 | Jamail | G06F 11/0709 726/25 |
| 9,692,778 | B1* | 6/2017 | Mohanty | G06F 21/50 |
| 9,749,349 | B1* | 8/2017 | Czarny | G06F 16/21 |
| 10,015,186 | B1* | 7/2018 | Tamir | G06F 21/577 |
| 2003/0217264 | A1* | 11/2003 | Martin | G06F 21/6209 713/156 |
| 2004/0133876 | A1* | 7/2004 | Sproule | G06Q 10/063 717/105 |
| 2004/0250115 | A1* | 12/2004 | Gemmel | G06F 21/562 726/24 |
| 2005/0138413 | A1* | 6/2005 | Lippmann | G06F 21/577 726/4 |
| 2006/0191012 | A1* | 8/2006 | Banzhof | G06F 21/577 726/25 |
| 2007/0101432 | A1* | 5/2007 | Carpenter | G06F 21/577 726/25 |
| 2010/0287377 | A1* | 11/2010 | Lim | G06F 21/6218 713/176 |
| 2012/0100825 | A1* | 4/2012 | Sherman | H04W 4/029 455/404.2 |
| 2012/0143650 | A1* | 6/2012 | Crowley | G06F 21/554 705/7.28 |
| 2013/0006702 | A1 | 1/2013 | Wu | |
| 2013/0024382 | A1* | 1/2013 | Dala | G06F 21/602 705/51 |
| 2013/0031634 | A1* | 1/2013 | McClure | H04L 41/5035 726/25 |
| 2014/0082733 | A1* | 3/2014 | Benefield | G06F 21/577 726/25 |
| 2014/0237545 | A1* | 8/2014 | Mylavarapu | H04L 63/1441 726/3 |
| 2014/0278538 | A1* | 9/2014 | Smith | G06Q 10/0635 705/3 |
| 2015/0127348 | A1* | 5/2015 | Follis | G06F 21/10 704/260 |
| 2015/0206106 | A1* | 7/2015 | Yago | G06F 21/645 705/68 |
| 2015/0319185 | A1* | 11/2015 | Kirti | H04L 63/1416 726/23 |
| 2016/0175408 | A1* | 6/2016 | Chang | A61K 38/063 604/506 |
| 2016/0182487 | A1* | 6/2016 | Zhu | H04L 63/0823 726/9 |
| 2016/0234239 | A1* | 8/2016 | Knapp | H04L 63/1433 |
| 2016/0269434 | A1* | 9/2016 | DiValentin | H04L 63/1408 |
| 2017/0098087 | A1* | 4/2017 | Li | H04L 63/1433 |
| 2017/0171235 | A1* | 6/2017 | Mulchandani | H04L 63/1425 |
| 2017/0180133 | A1* | 6/2017 | Kumar | H04L 9/3247 |
| 2017/0214701 | A1* | 7/2017 | Hasan | H04L 63/1408 |
| 2018/0068241 | A1* | 3/2018 | Varkey | G06F 21/577 |
| 2018/0189697 | A1* | 7/2018 | Thomson | H04L 63/1408 |
| 2019/0050587 | A1* | 2/2019 | Dang | G06F 21/604 |
| 2019/0130075 | A1* | 5/2019 | Henein | G06F 21/577 |

OTHER PUBLICATIONS

Stephen L. Grimes, Scot Copeland and Todd Cooper; "CE-IT Collaboration Town Hall Series"; Mar. 23-24, 2016.
IEC: International Standard; "Medical electric equipment—Part 1: General requirements for basic safety and essential performance"; IEC 60601-1; Third edition; 2005.
IEC: International Standard; "Medical electric equipment—Part 1-2: General requirements for basic safety and essential performance—Collateral standard: Electromagnetic compatibility—Requirements and tests"; IEC 60601-1-2; Third edition; 2007.
AAMI; Technical Information Report; "Application of risk management for IT-networks incorporating medical devices—Part 2-2: Guidance for the disclosure and communication of medical device security needs, risks and controls"; ANSI/AAMI/IEC TIR80001-2-2; 2012.
AAMI; Technical Information Report; "Application of risk management for IT-networks incorporating medical devices—Part 2-3: Guidance for wireless networks"; ANSI/AAMI/IEC TIR80001-2-3; 2012.
ISO/IEC; International Standard; "Information technology—Security techniques—Information security management systems—Requirements"; ISO/IEC FDIS 27001; 2005.
ISO/IEC; International Standard; Information technology—Security techniques—Code of practice for information security management; ISO/IEC 27002; First edition; 2005.
ISO; International Standard; "Medical devices—Application of risk management to medical devices"; ISO 14971; Second edition; 2007.
ISO; Technical Specification; "Medical devices—Hierarchical coding structure for adverse events—Part 2: Evaluation codes"; ISO/TS 19218-2; First edition; 2012.
ISO; International Standard; Health informatics—Information security management in health using ISO/IEC 27002; ISO 27799; First edition; 2008.

* cited by examiner

DEVICE VULNERABILITY MANAGEMENT

CROSS-REFERENCE TO RELATED APPLICATIONS

This application claims the benefit of U.S. Provisional Patent Application Ser. No. 62/514,956, filed Jun. 5, 2017, entitled METHOD AND APPARATUS FOR IMPLEMENTING MEDICAL DEVICE RISK & VULNERABILITY MANAGEMENT SYSTEM, WORKFLOW AND ASSOCIATED FUNCTIONS IN A HEALTHCARE DELIVERY ORGANIZATION, the disclosure of which is hereby incorporated herein by reference.

BACKGROUND

Various aspects of the present disclosure relate generally to managing cyber-related issues in electronic devices, and in particular to remediating or mitigating cyber-related operability issues in electronic devices (including special purpose electronic device), remediating or mitigating device vulnerabilities, controlling device vulnerability workflows, combinations thereof, etc.

Cyber-attacks are malicious acts that target computer information systems, infrastructures, computer networks, and other computing devices. Cyber-attacks typically gain unauthorized access to susceptible computer devices and/or systems to perform one or more nefarious acts, which can include stealing information, making alterations, corrupting or destroying information, spying on data communications, holding information or access for ransom, etc. Cyber-attacks affect virtually every industry with a presence on the Internet. As a specific example, the healthcare industry is facing an increasing risk of cyber-attacks. In this regard, cyber-attacks can affect patient safety, expose patient information, and affect health care facility operation.

BRIEF SUMMARY

According to aspects of the present disclosure, a computer-implemented process for remediating or at least mitigating cyber-related operability issues in special purpose electronic devices is provided. The process comprises creating a device profile for each of a plurality of special purpose electronic devices, where each device profile includes variables that define cyber-related characteristics of the associated one of the plurality of special purpose electronic devices. The process also comprises generating, for at least one created device profile, a verification and validation test plan that sets forth requirements to declare a cyber-related device modification responsive to a detected cyber-related operability issue, suitable for implementation. The generated verification and validation test plan is utilized to generate a network exploitability score based at least in part upon the associated cyber-related operability issue. The process still further comprises evaluating the plurality of special purpose electronic devices using at least one dynamic device level vulnerability model and outputting a device-level prioritization of the plurality of special purpose electronic devices according to the detected cyber-related operability issue.

The process also comprises generating a network-level prioritization of the plurality of special purpose electronic devices by evaluating the network exploitability score from the associated verification and validation test plan, and by evaluating at least one network-related variable. The process still further comprises evaluating the device-level prioritization and the network-level prioritization according to at least one time-based mitigation factor and mitigation action data associated with each detected cyber-related operability issue to generate an overall prioritized action plan, wherein the special purpose electronic devices are reprioritized based upon their associated network-level prioritization. Moreover, the process comprises assigning remediation/mitigation tasks to remediate each cyber-related operability issue according to the generated overall prioritized action plan.

According to further aspects of the present disclosure, a computer-implemented process of remediating or at least mitigating device security vulnerabilities is provided. The computer-implemented process comprises determining identifications of electronic devices associated with an entity. The computer-implemented process also comprises calculating, for each device, a security cyber-vulnerability score. For instance, in an example embodiment, the cyber-vulnerability score is calculated by generating a device cyber-vulnerability score value based upon known threats and vulnerabilities, generating a device level cyber-vulnerability score by augmenting the generated device cyber-vulnerability score value based upon at least one device level parameter, generating an environmental cyber-vulnerability score, and computing an overall cyber-vulnerability score based upon the device level cyber-vulnerability score and the environmental cyber-vulnerability score. The computer-implemented process also comprises prioritizing the electronic devices based upon the computed overall cyber-vulnerability score for each device, and identifying whether a patch or an alternate control is available for at least one electronic device. Also, the computer-implemented process comprises initiating a remediation/mitigation workflow to patch at least one identified electronic device based upon determining that the identified device has a high priority and determining that a patch or an alternate control is available for that device.

DETAILED DESCRIPTION

Figure 1:
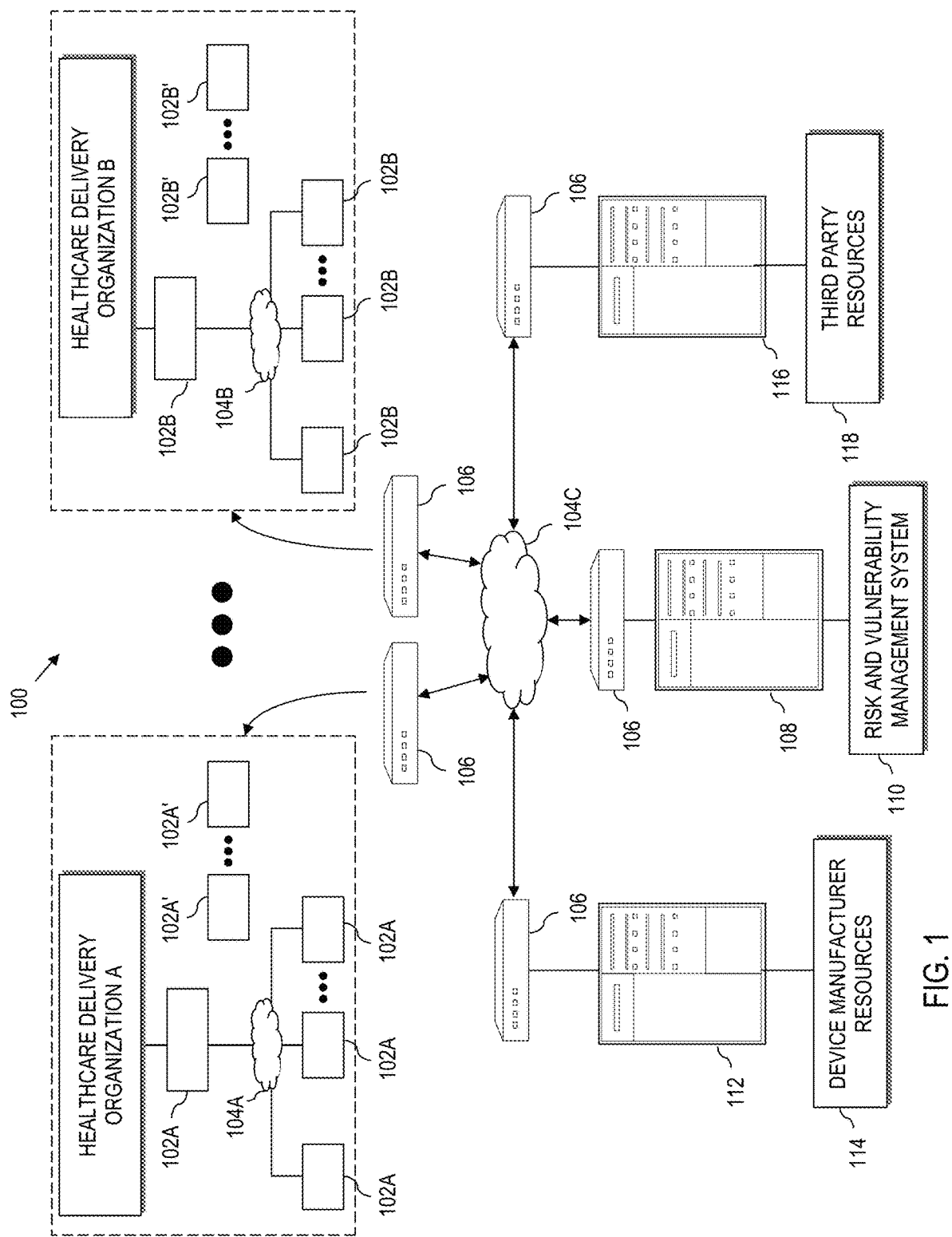
FIG. 1 is a system diagram of a vulnerability management system according to aspects herein.

Cyber-vulnerabilities are particularly challenging in environments where large numbers of special purpose electronic devices are maintained. For instance, special purpose electronic devices can be implemented as medical devices in the medical field, control devices, machines, tools, vehicles, etc., in industrial applications, etc. For sake of clarity of illustration, the present disclosure provides an example of managing cyber-related security issues in a medical environment. However, concepts herein are applicable to other fields, including industrial controls, etc.

In the context of the medical field, healthcare delivery organizations (HDOs) face several challenges that limit their ability to perform optimal vulnerability management of medical devices. For instance, many patches released from subsystem providers are not evaluated by original equipment manufacturers (OEM's). Alternatively, some OEMs do not evaluate patches in timely manner. Also, for example, there is currently no central repository for OEMs to disseminate information for certain medical devices. Likewise, there is no central repository for providers to obtain patches and other vulnerability remediation/mitigation information for certain medical devices in a timely and organized manner. Yet further, there are currently mixed practices around verifying and validating the clinical performance of medical devices and systems in various clinical information technology (IT) network configurations. However, aspects of the present disclosure comprise systems and processes that provide particular solutions to the above-problems, e.g., by providing structures for remediating or at least mitigating cyber-related operability issues in special purpose electronic devices, providing structures for remediating or at least mitigating device security vulnerabilities, etc., as described more fully with reference to the FIGURES herein.

Compounding the above-problems lies a lack of understanding centering around accountability between OEMs and providers for the verification and validation of medical device patching in clinical information technology networks utilized by HDOs. However, aspects of the present disclosure comprise systems and processes that provide verification and validation of medical device patching in clinical information technology networks, as described more fully with reference to the FIGURES herein.

Moreover, a problem faced by many HDOs is an unclear understanding of accountability among various functions within the HDO (e.g., among a care setting such as a biomedical department, information technology department, clinicians, risk teams, etc.) when performing an update in response to a released patch or identified vulnerability. Expanding upon the above, HDOs may have a limited understanding of the risk level to their enterprise due to vulnerabilities at the medical device level, which is often caused by an underdeveloped process for evaluating, resourcing and managing risks. Problems are further compounded by a lack of governance and no structured control method for reporting and auditing relevant risk and events. However, aspects of the present disclosure comprise systems and processes that solve the above-problems by providing a clear understanding of accountability around performing updates per released patch or identified vulnerability among various functions within an HDO, as described more fully with reference to the FIGURES herein.

As noted more fully herein, HDOs currently do not have a structured system to handle vulnerability management of medical devices either during the acquisition phase or during the post deployment phase. However, aspects of the present disclosure comprise systems and processes that provide particular solutions to the above-problems by handling the vulnerability management of medical devices through the development of prioritized workflows, as described more fully with reference to the FIGURES herein. In particular, embodiments herein utilize algorithms to derive a clear understanding of how a particular OEM manages medical device vulnerabilities, e.g., from historical evidence, enabling the system herein to understand potential risk of procuring a device from that OEM versus other options.

Moreover, different organizations employ different and mostly manual processes for identifying vulnerabilities, identifying an availability of patches, evaluating risk, and controlling the deployment and monitoring of patches to medical devices. However, aspects of the present disclosure comprise systems and processes that solve this problem by providing a central view of security risks that can scale to accommodate thousands of medical devices in an HDO.

As such, the present disclosure provides improvements that are necessarily rooted in computer technology in order to overcome a problem specifically arising in the realm of computer networks. Specifically, the present disclosure provides an improvement in computer validation, deployment, security, vulnerability, and patching. Aspects of the present disclosure further provide improvement to the technical field of cyber-security, particularly as it pertains to special purpose hardware devices, such as medical devices, including monitors, sensors, etc., as set out more fully herein.

System Overview

Referring now to the drawings and in particular FIG. 1, a network system 100 is illustrated according to aspects of the present disclosure herein. Within the network system 100, processing devices designated generally as 102, communicate across one or more networks 104 as schematically illustrated. Each processing device 102 may comprise a mainframe computer, server computer, network addressed storage (NAS), file server, personal computer, notebook computer, tablet, transactional system, purpose-driven appliance, cellular device including smart telephone, etc. However, as described herein, processing devices 102 can also comprise special purpose electronic devices. In the context of FIG. 1, such special purpose electronic devices can be implemented as electronic medical devices.

In example embodiments herein, and consistent with the United States Food and Drug Administration, a medical device is "an instrument, apparatus, implement, machine, contrivance, implant, in vitro reagent, or other similar or related article, including a component part, or accessory which is: recognized in the official National Formulary, or the United States Pharmacopoeia, or any supplement to them, intended for use in the diagnosis of disease or other conditions, or in the cure, mitigation, treatment, or prevention of disease, in human or other animals, or is intended to affect the structure or any function of the body of human or other animals (and which does not achieve any of its primary intended purposes through chemical action within or on the body of human or other animals and which is not dependent upon being metabolized for the achievement of any of its primary intended purposes). In addition, relevant medical devices can have one or more of an operating system, anti-virus, anti-malware, anti-ransomware, firmware, drivers, software platforms and other software requiring updates.

As a few non-limiting examples, a medical device can include a glucometer, scale, heart rate monitor, blood pressure monitor, ultrasound monitor, vital signs monitor, insulin monitor, drug dispensing pump, test machine (MRI, X-RAY, etc.), operating room monitor, robot, patient monitor, fall detector, and other networkable special purpose electronic/computing/hardware devices.

For purposes of example herein, groups of processing devices are controlled by a particular entity, e.g., a healthcare delivery organization (HDO). A HDO can comprise by way of example, a hospital, clinic, treatment center, medical office or other medical institution, etc., that uses one or more medical devices. As such, processing devices 102 are further referenced with an "A", "B", etc., to indicate membership in an environment controlled by a particular HDO.

In the context of an HDO, it is possible that special purpose medical device hardware 102, e.g., an electronic medical device, is not directly connected to any network. Such non-networked processing devices are referenced with a prime, e.g., 102A', 102B', etc.

The networks 104 provide communication links between the various processing devices 102. Accordingly, each network 104 may be supported by networking components 106 such as routers, switches, hubs, firewalls, network interfaces, wired or wireless communication links and corresponding interconnections, cellular stations and corresponding cellular conversion technologies, e.g., to convert between cellular and TCP/IP, etc. Some such devices are not shown for purposes of clarity.

Moreover, each network 104 may comprise connections using one or more intranets, extranets, local area networks (LAN), wide area networks (WAN), wireless networks (WiFi), the Internet, including the world wide web, a cloud, and/or other arrangements for enabling communication between the processing devices, in either real time or otherwise, e.g., via time shifting, batch processing, etc.

For instance, in an example implementation, processing devices 102A (e.g., associated the HDO A) are connected to a first network 104A (e.g., a LAN) that is managed by or on behalf of the HDO A. Here, processing devices 102A that are also medical devices can have limited connectivity, e.g., only to the network 104A or subparts thereof. However, processing devices 102A such as servers, desktop computers, etc., within the HDO A can communicate across the network 104A (LAN) and some may also be operably configured to communicate across the network 104C (e.g., the Internet).

Analogously, processing devices 102B (e.g., associated the HDO B) are connected to a first network 104B (e.g., a LAN) that is managed by or on behalf of the HDO B. Here, processing devices 102B that are also medical devices can have limited connectivity, e.g., only to the network 104B or subparts thereof. However, processing devices 102B such as servers, desktop computers, etc., within the HDO B can communicate across the network 104B (LAN) and some may also be operably configured to communicate across the network 104C (e.g., the Internet).

The network system 100 also comprises a specific processing device, designated 108 that executes at least a portion of a medical device risk and vulnerability management system 110, which is described in greater detail herein.

The network system 100 can also optionally include an electronic connection to a processing device 112 that is associated with a device manufacturer of at least one electronic medical device. The device manufacturer can thus make available to the risk and vulnerability management system 110, device manufacturer resources 114, e.g., patches, updates, drivers, documentation, etc. In practice, there are numerous device manufacturers. Thus, the medical device risk and vulnerability management system 110 communicates with a plurality of instances of the processing device 112, and hence, a plurality of instances of device manufacturer resources 114. Thus, a single processing device 112 and corresponding device manufacturer resources 114 are shown solely for conciseness of the explanation herein.

Still further, the network system 100 can also optionally include an electronic connection to a processing device that is associated with a third-party vulnerability source. The third-party vulnerability source 116 can provide access to third-party resources 118, e.g., medical device catalogues, recall information, government regulations, security alerts, vulnerability reports, etc., which will be described in greater detail herein. In practice, the medical device risk and vulnerability management system 110 communicates with a plurality of third-party vulnerability sources 116, and hence a plurality of third-party resources 118. Thus, a single third-party vulnerability source 116 and corresponding third-party resources 118 are shown solely for conciseness of the explanation herein.

In practice, the medical device risk and vulnerability management system 110 can communicate, e.g., across the network 104C, with a plurality of device manufacturer servers 112, and hence a plurality of device manufacturer resources 114. Likewise, the medical device risk and vulnerability management system 110 can communicate, e.g., across the network 104, with a plurality of third-party vulnerability sources 116, and hence a plurality of third-party resources 118.

Also, the medical device risk and vulnerability management system 110 can communicate with at least one processing device 102 at each HDO (e.g., HDO A and HDO B as illustrated). In some embodiments, the medical device risk and vulnerability management system 110 only communicates with one or more computers, e.g., desktop, laptop, servers, etc., of the HDOs. Here, a user at a HDO can interact with the medical device risk and vulnerability management system 110, e.g., via a web browser, to interact with risk and vulnerability data associated with that HDO. That is, in such embodiments, the medical device risk and vulnerability management system 110 does not directly interact with networkable medical devices themselves. Rather, only information about medical devices are collected and transferred to the medical device risk and vulnerability management system 110 across the network(s), e.g., across a cloud.

In other embodiments, the medical device risk and vulnerability management system 110 can interact with one or more medical devices 102 at an associated HDO. For instance, in such an embodiment, the risk and vulnerability management system 110 interacts directly with a medical device 102A by communicating across the network 104C (e.g., the Internet) and by communicating across the local network 104A (e.g., the HDO A LAN).

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the various networks.

Vulnerability Architecture

Figure 2:
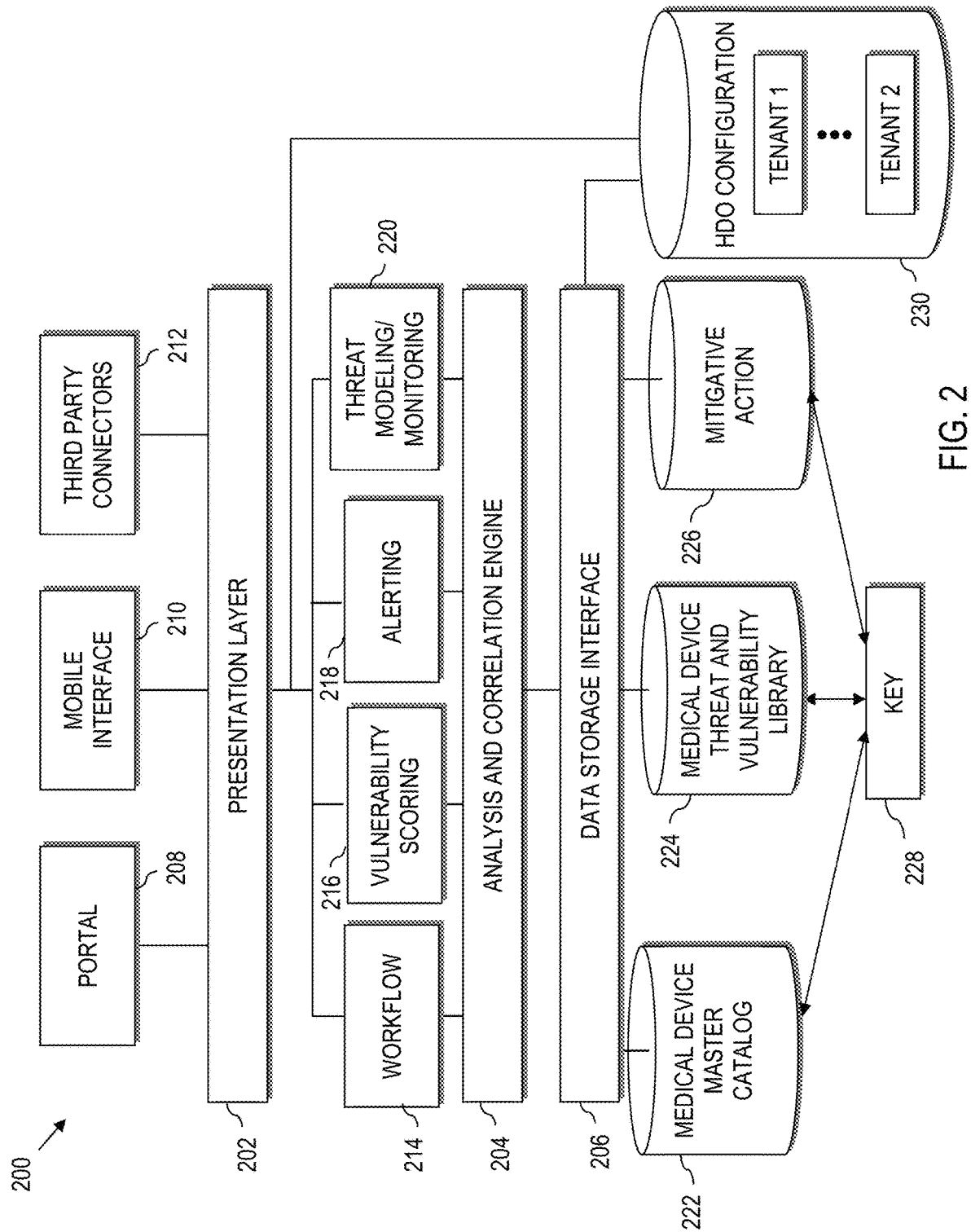
FIG. 2 is a block diagram of select components of a vulnerability management system according to aspects herein.

Referring to FIG. 2, a block diagram illustrates an example medical device vulnerability management system 200. For instance, the medical device vulnerability management system 200 can be used to implement the risk and vulnerability management system 110 in FIG. 1, e.g., by managing the risk of vulnerabilities to special purpose electronic devices, e.g., medical devices.

According to certain aspects of the present disclosure, managing the risk of vulnerabilities of medical devices enables the ability to manage the operability of such medical devices, e.g., by remediating or at least mitigating the threat. In this regard, managing the "operability" of a medical device includes managing the "interoperability", i.e., ability of the medical device to operate in a system with at least one other device. Moreover, as used herein, remediation can include the eradication of an identified threat, e.g., removing a virus, closing a port susceptible to cyber-vulnerability, etc. Comparatively, mitigation comprises attempting to minimize risk of a cyber-threat, minimizing damage caused by a cyber-issue, etc. Still further, as used herein, "cyber" is utilized to refer to electronic, computer, network, and other vulnerabilities, e.g., as distinguished from mechanical failures, etc.

Components of the medical device vulnerability management system 200 are introduced first, and then the components are discussed in greater detail herein.

In practice, the medical device vulnerability management system 200 may be implemented on computer-readable hardware that stores machine-executable program code, where the program code instructs a processor to implement functionality associated with the described functions. The medical device vulnerability management system 200 may also be executed by a processor coupled to memory, where the processor is programmed by program code stored in the memory to perform the described functionality of the components as described more fully herein.

Medical Device Vulnerability Management System

The medical device vulnerability management system 200 comprises in general, a presentation layer 202, an analysis and correlation engine 204, and a data storage interface 206.

The illustrated presentation layer 202 controls a user experience with the medical device vulnerability management system 200 by providing a graphical user interface that enables a user to interface with, or otherwise interact with the analysis and correlation engine 204. For instance, in the illustrated embodiment, the presentation layer 202 facilitates communication via a portal 208, a mobile interface 210, and optionally, at least one third-party connector 212.

The portal 208 can be implemented as a web portal providing a graphical user interface that enables a user (e.g., of HDO A or HDO B shown in FIG. 1) to log into the medical device vulnerability management system 200 from a desktop, laptop, or other conventional computer device.

The mobile interface 210 provides a graphical user interface that enables a user (e.g., of HDO A or HDO B shown in FIG. 1) to log into the medical device vulnerability management system 200 from a tablet, smart phone, or other mobile device. Here, the mobile interface 210 provides a responsive graphical experience that is formatted for a traditionally smaller display area.

The optional third-party connectors 212 interface with third-party software, hardware, a combination thereof, etc.

The analysis and correlation engine 204 comprises the necessary components to perform vulnerability assessment (described hereafter), and is shown as comprising a workflow component 214, a cyber-vulnerability (e.g., risk) scoring component 216, an alerting component 218, and a threat modeling/monitoring component 220, described below.

The data storage interface 206 provides an interface that communicably couples the analysis and correlation engine 204 to one or more sources of data. For instance, the data storage interface 206 is illustrated as coupling the analysis and correlation engine 204 to a medical device master catalog 222, a medical device threat and vulnerability library 224, and a mitigative action data source 226.

The medical device vulnerability management system 200 establishes electronic connectivity to various processing devices (e.g., processing devices described with reference to FIG. 1) to gather medical device information into the medical device master catalog 222, e.g., via querying processing devices for information, receiving data communications from remote processing devices, combinations thereof, etc. In an example implementation, the medical device master catalog 222 stores data that can include, but is not limited to medical device make, model, platform version, an inventory of software and software versions, operating system, operating system versions, service pack version, validated patch and validated patch version, combinations thereof, etc. Such data can be collected from one or more medical device manufacturers (MDM), e.g., via device manufacturer resources 114 of FIG. 1, from one or more trusted third parties, e.g., via third-party resources 118 of FIG. 1, (such as the United States Food and Drug Administration), combinations thereof, etc. Such data can be actively updated on the medical device master catalog 222, such as by periodically querying resources, by receiving data pushes from external data sources, combinations thereof, etc. As a few additional examples, data in the medical device master catalog 222 can be derived from a medical device manufacturer product list, from the United States Food and Drug Administration 510(k) database, etc.

The medical device vulnerability management system 200 establishes electronic connectivity to different threat and vulnerability publishing entities (e.g., processing devices described with reference to FIG. 1) to gather, normalize and store threat and vulnerability data into the medical device threat and vulnerability library 224. Data can be gathered via querying processing devices for information, receiving data communications from remote processing devices, combinations thereof, etc.

In certain example implementations, data collected into the medical device master catalog 222 is relationally linked to the data in the medical device threat and vulnerability library 224, such as by way of a key 228 (e.g., a common medical device identifier).

For instance, in an example implementation, the medical device threat and vulnerability library 224 stores information that can include, but is not limited to, information from medical device manufacturers (e.g., validated software patch releases, security and/or operational alerts, device recall notifications, device end of life and end of support notifications, combinations thereof, etc.); Manufacturer Disclosure Statements for Medical Device Security (MDS2) created by medical device manufacturers; cybersecurity guidance from third-party organizations (e.g., the National Institute of Standards and Technology NIST); device vulnerability information reported to the Medical Device Vulnerability Intelligence Program for Evaluation and Response MD-VIPER database; medical device cyber security alerts reported by the Industrial Control Systems Cyber Emergency Response Team; information extracted from the United States Food and Drug Administration (such as cybersecurity guidance information on medical devices, medical device alerts, medical device recalls and bans, etc.); information from Original Equipment Manufacturers and off-theshelf software vendors (such as patch releases impacting medical devices, security alerts impacting medical devices, etc.); information from the ECRI Institute; other relevant sources where medical device security information is released; combinations thereof, etc.

Moreover, any data captured in the medical device threat and vulnerability library 224 can be screened, such as by a medical device security research and validation team. For instance, a medical device security research and validation team can augment the data stored in the medical device threat and vulnerability library 224.

The medical device vulnerability management system 200 still further establishes electronic connectivity to various processing devices (e.g., processing devices described with reference to FIG. 1) to gather information into the mitigative action data source 226, e.g., via querying processing devices for information, receiving data communications from remote processing devices, combinations thereof, etc. In an example embodiment, the mitigative action data source 226 stores action information, such as processes, procedures, best practices, strategies, recommendations, prioritizations, protocols, combinations thereof, etc., to address detected vulnerabilities.

Data collected into the mitigative action data source 226 is relationally linked to the data in the medical device master catalog 222, and data in the medical device threat and vulnerability library 224, such as by way of the key 228 (e.g., a common medical device identifier).

The medical device vulnerability management system 200 also comprises a Healthcare Delivery Organization (HDO) configuration data source 230. The HDO configuration data source 230 stores the medical device customers, e.g., HDOs such as hospitals, clinics, treatment centers, etc. As illustrated, each HDO is identified as a "tenant" in the HDO configuration data source 230. The HDO configuration data source 230 can also store configuration information, customer/client information and other user-specific information, history information, medical device information, software and versioning information for the medical devices, etc.

By way of example, the HDO configuration data source 230 can store information collected from an HDO's computerized maintenance management system (CMMS), including but not limited to specific data elements of the associated medical device inventory. The acquired data elements can include by way of illustration, and not by way of limitation, an asset identifier, a system identifier, a manufacturer, a device type, a model, a version, an operating system name, an operating system version current patch level, a customer name, a customer facility, a department, a room, a technology owner, combinations thereof, etc.

The HDO configuration data source 230 can also store customer medical device data collected from each HDO, such as custom risk inputs, use cases, compensating controls, support contract information, network exposure information, physical exposure information, etc.

The workflow component 214 controls the workflows for performing device vulnerability assessment and remediation/mitigation. The workflow component 214 interacts with the presentation layer 202 to convey remediation/mitigation workflow information to a corresponding HDO. Likewise, the workflow component 214 interacts with data via the data storage interface 206 to define the details of a generated workflow.

The cyber-vulnerability scoring component 216 scores medical device risk, which is used by the workflow component 214 to schedule remediation/mitigation activities and perform other workflow operations. The cyber-vulnerability scoring component 216 interacts with the data specific to and HDO, e.g., via interaction with the HDO configuration data source 230. Likewise, the cyber-vulnerability scoring component 216 interacts with the data storage interface 206 to extract information from one or more of the medical device master catalog 222, medical device threat and vulnerability library 224, and mitigative action data source 226.

The alerting component 218 provides alerts and other necessary information to derive workflows, e.g., which are carried out by the workflow component 214. For instance, the alerting component 218 interacts with the cyber-vulnerability scoring component 216 and threat modeling/monitoring component 220 to identify and prioritize medical device risk. Based upon any alerts generated thereby, the alerting component 218 interacts with the workflow component 214 to initiate the necessary remediation/mitigation action(s).

The threat modeling/monitoring component 220 provides the threat modeling that is used to assess medical device vulnerability. In this regard, the threat modeling/monitoring component 220 interacts with the data specific to a HDO, e.g., via interaction with the HDO configuration data source 230. Likewise, the threat modeling/monitoring component 220 interacts with the data storage interface 206 to extract information from one or more of the medical device master catalog 222, medical device threat and vulnerability library 224, and mitigative action data source 226. In certain embodiments, modeling is utilized to evaluate a security threat. The model(s) can take advantage of monitoring to constantly (or otherwise at periodic intervals), update the model outputs based upon changes in the underlying data. In this regard, the threat modeling/monitoring component 220 can utilize state changes of the data linked to a model form to trigger recalculation, or the model(s) may freewheel, updating based upon a criteria.

Vulnerability Management Workflow

Figure 3:
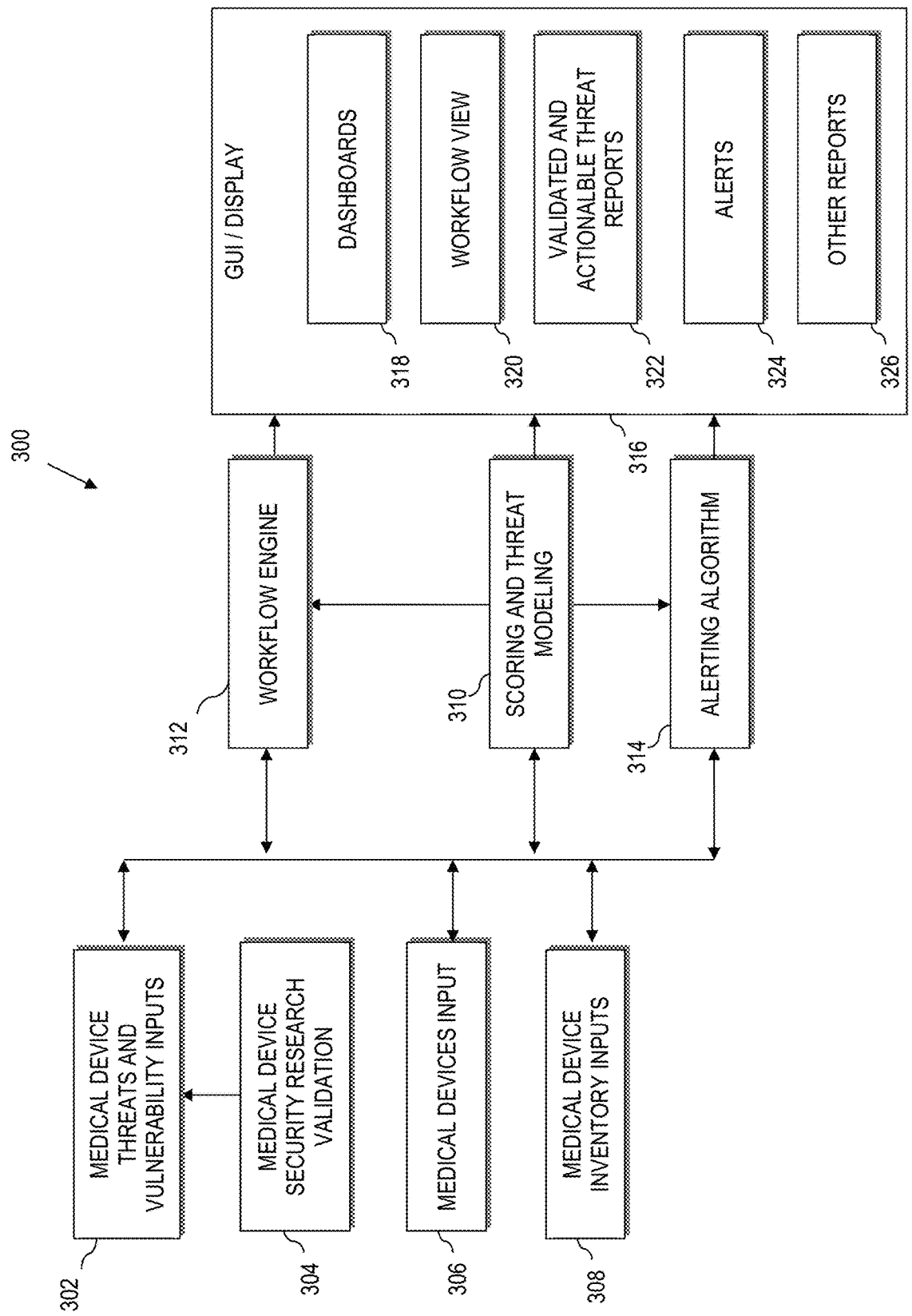
FIG. 3 is a flowchart illustrating an example workflow of a vulnerability management system according to aspects herein.

Referring now to FIG. 3, a vulnerability management workflow 300 is illustrated according to aspects of the present disclosure. The vulnerability management workflow 300 can be implemented for instance, by the medical device vulnerability management system 200 of FIG. 2, and/or across the network system 100 of FIG. 1 via the vulnerability management system 110 of FIG. 1.

In general, the vulnerability management workflow 300 is predicated upon several inputs. For instance, the vulnerability management workflow 300 obtains medical device threat and vulnerability inputs 302. The medical device threat and vulnerability inputs 302 can be derived for instance, from the medical device threat and vulnerability library 224 described more fully herein with regard to FIG. 2. In illustrative implementations, the vulnerability management workflow 300 can pull the medical device threat and vulnerability inputs 302, such as by querying the medical device threat and vulnerability library 224 (FIG. 2). In other implementations, medical device threat and vulnerability inputs 302 can be pushed to the vulnerability management workflow 300.

In some embodiments, the medical device threat and vulnerability inputs 302 are filtered by medical device security research and validation 304. Here, the medical device threats and vulnerabilities inputs 302 are evaluated before functioning as inputs. The evaluation can be carried out to ensure that the inputs are relevant to the facts associated with the particular HDO (e.g., tenant in FIG. 2). For instance, an HDO such as a hospital environment is dynamic and potentially co-dependent. That is, when versioning software, the HDO must evaluate not only how the software version will affect the corresponding medical device, but the HDO may also evaluate how that medical device is used in the HDO's practice. Moreover, the HDO may consider how the relevant medical device interacts with other medical devices in the environment of use.

As another example, a medical devices input 306 is provided. The medical devices input 306 can be derived for instance, from the medical device master catalog 222 described more fully herein with regard to FIG. 2, and from the Tenant information in the HDO configuration data source 230. As an illustrative example, assume that the vulnerability management workflow 300 is operating to process the security state of Tenant 1 in the HDO configuration data source 230 (FIG. 2). The workflow can use the available medical devices listed in the data for Tenant 1 in the HDO Configuration data source 230 as a means to reference corresponding data about each utilized medical device in the medical device master catalog 222 (FIG. 2), e.g., by issuing one or more queries. In other implementations, medical device inputs 302 can be pushed to the vulnerability management workflow 300.

As noted above, the workflow 300 utilizes knowledge of the medical devices used by an HDO. In this regard, the vulnerability management workflow 300 receives medical device inventory inputs 308. The medical device inventory inputs 308 can be derived from the records associated with a particular tenant in the HDO configuration data source 230 of FIG. 2. Thus, the medical device inventory inputs 308 identify those medical devices that are of interest to a particular entity, such as a hospital, clinic, etc.

In operation, select medical device threats and vulnerability inputs 302, select medical device inputs 306, select medical device inventory inputs 308 (e.g., those inputs associated with the HDO of interest), or combinations thereof are directed to the cyber-vulnerability scoring and threat modeling algorithm 310. The cyber-vulnerability scoring features can be implemented for instance, by the cyber-vulnerability scoring component 216 (FIG. 2), whereas the threat modeling can be carried out, for instance, by the threat modeling/monitoring component 220 (FIG. 2).

The cyber-vulnerability scoring and threat modeling algorithm 310 evaluates risks of the various medical devices associated with the HDO (e.g., hospital). The cyber-vulnerability scoring and threat modeling algorithm 310 outputs cyber-vulnerability scores for the various medical devices inventoried for the HDO to a workflow engine 312. Cyber-vulnerability scoring is also displayed in a user dashboard, thus the cyber-vulnerability scoring and threat modeling algorithm 310 (or at least the output thereof) is also communicably coupled to a graphical user interface (GUI) 316.

The workflow engine 312 generates/controls remediation/mitigation workflows based upon output from the cyber-vulnerability scoring and threat modeling algorithm 310. In this regard, in order to generate a suitable workflow, the workflow engine 312 can obtain medical device threats and vulnerability inputs 302, medical device inputs 306, medical device inventory inputs 308, or combinations thereof. Moreover, the workflow engine 312 outputs relevant workflow data to the graphical user interface (GUI) 316. In certain embodiments, the workflow engine 312 can be implemented by the workflow component 214 (FIG. 2). Workflows are described in greater detail herein.

In example embodiments, the system can implement threat modeling at one location based upon monitored/or monitoring events at other locations. By way of example, threat modeling (e.g., via the cyber-vulnerability scoring and threat modeling algorithm 310, threat modeling 220, FIG. 2, etc.) can be programmed to drive efficient mitigation (e.g., via workflows implemented by the workflow engine 312, workflow 214 FIG. 2, etc.) at an HDO location by monitoring events at other HDOs, which may be located locally, regionally, nationwide, or at other appropriate ranges.

As a working example, assume that a vulnerability has surfaced on a specific device at a first HDO. Also assume that the first HDO has chosen to apply a first mitigative control. The first mitigative control can then communicated from the first HDO to the mitigative action data source 226. Now, assume that a second HDO experiences a need to respond to the vulnerability on their instance of the same specific device. The analysis engine can compare the effectiveness of that first mitigative control, e.g., by evaluating the time required to execute the mitigative control, and by analyzing a potential outcome from the test result against an alternative existing mitigative control. If the performance of the alternative mitigative action is deemed better than the first mitigative action, the system can include the alternative mitigative action in a database (e.g., the mitigative action data source 226, FIG. 2) as a best practice suggestion. Consequently, the learning system will over time have more sophisticated mitigative actions and suggestions. This wouldn't be otherwise feasible via manual human operation.

An optional alerting algorithm 314 receives outputs from the cyber-vulnerability scoring and threat modeling algorithm 310 to determine whether an alert should be generated, e.g., by using a rules engine to compare various medical device scores against benchmarks/thresholds. In some embodiments, the alerting algorithm 314 is implemented by the alerting component 218 (FIG. 2). In order to present information regarding alerts, the alerting algorithm 314 is also coupled to the graphical user interface 316.

As noted more fully herein, a threat can be characterized as a likelihood/probability of vulnerability to be exploited. In this regard, threat modeling can be derived by looking at vulnerabilities in a device (e.g., all vulnerabilities in a device) and statistically evaluating direct or closely tied incidents, such as by using a learning algorithm or deterministic algorithm. In this regard, a learning system can be developed over time. Hence, measuring effectiveness of mitigate control via time and outcome by sharing across other HDOs for implementation can deliver better outcomes and potentially optimized cost.

The graphical user interface 316 includes a number of output screens. The graphical user interface can be implemented, for instance, by the presentation layer 202 and corresponding portal 208, mobile interface 210 and optional third-party connector(s) 212 (FIG. 2).

In the illustrated implementation, the GUI 316 provides one or more dashboards 318. Each dashboard provides key performance indicators, real-time views of the state of the risk assessments of medical devices associated with the HDO, and other relevant information. For instance, dashboards can be utilized to summarize the information in a dashboard in words using analytic review of the data, provide a chart that shows the age of tasks and pinpointing where the bottlenecks are, etc.

If a particular medical device (or group of medical devices, etc.) have a cyber-vulnerability score that exceeds a predetermined threshold, then the GUI 316 can initiate a remediation/mitigation workflow output 320 that controls the flow of information to relevant stakeholders based upon information from the workflow engine 312 to ensure that the associated medical device is properly patched or otherwise remediated to minimize the computed cyber-vulnerability score for that medical device. Remediation/mitigation workflow is described in greater detail herein.

The GUI 316 can also be utilized to generate validated and actionable threat reports 322. These reports can be utilized to identify, for instance, those medical devices within the HDO (e.g., hospital), that have a threat level that exceeds a predetermined threshold, for which a validated and actionable resolution has been identified.

The GUI 316 can further be utilized to generate alerts 324, e.g., based upon information from the alerting algorithm 314. Alerts 324 can be generated, for instance, in response to a cyber-vulnerability score exceeding a predetermined threshold.

Likewise, the GUI 316 can generate other reports 326 that are utilized to report the status of monitored medical devices, that track medical device location, deployment, utilization, or other relevant metrics.

Patch Management Workflow

Figure 4:
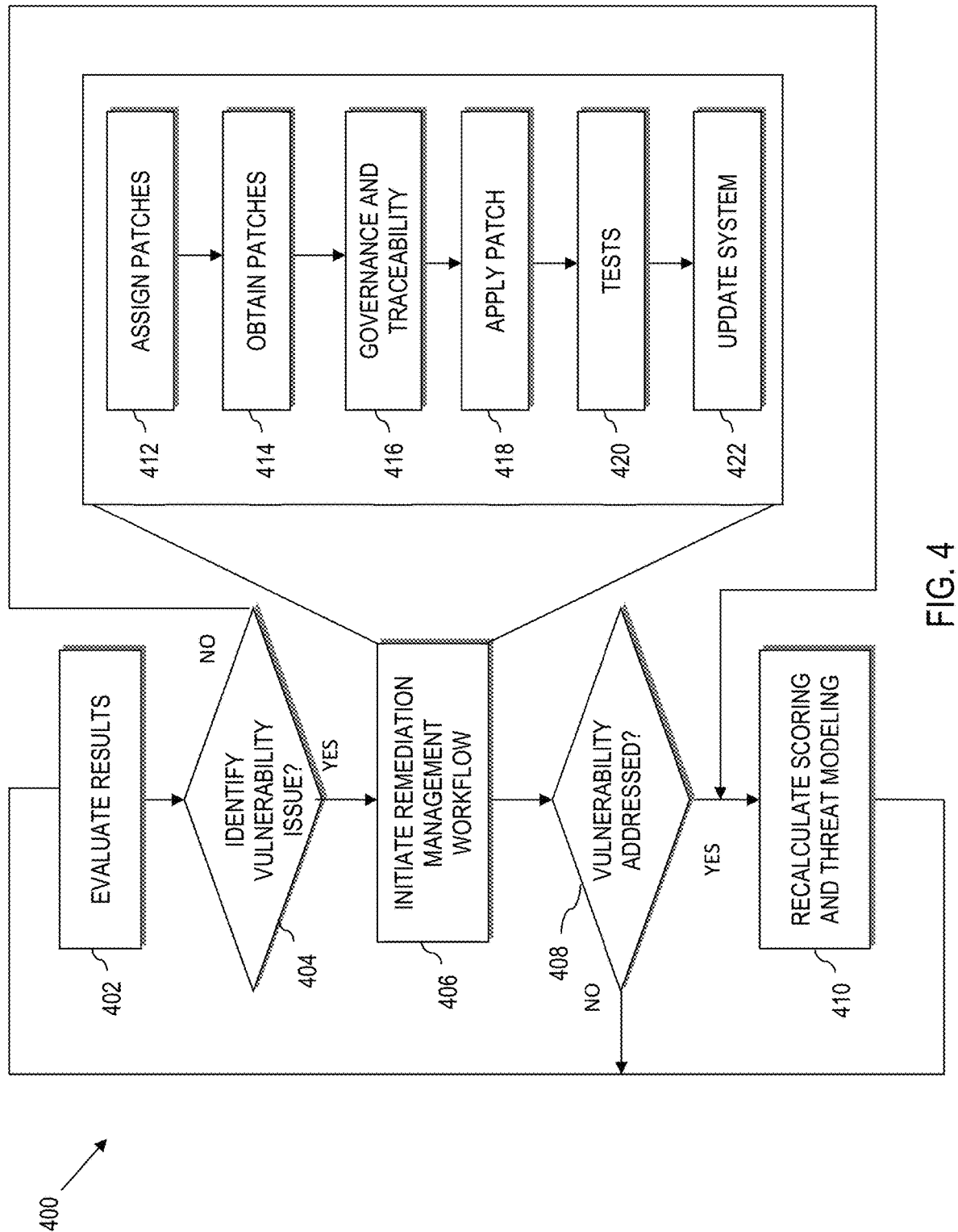
FIG. 4 is a flowchart illustrating an example remediation/mitigation workflow of a vulnerability management system according to aspects herein.

Referring to FIG. 4, an example remediation/mitigation workflow algorithm 400 is illustrated according to aspects of the present disclosure. The remediation/mitigation workflow algorithm 400 can be implemented, for instance, in response to the workflow engine 312 generating a remediation/mitigation workflow output 320 (FIG. 3), the workflow component 214 triggering a workflow, etc.

Assume a threat or vulnerability has been detected. For instance, a clinical manager can be reviewing the dashboards 318 (FIG. 3) and detect that a medical device security issue exists. The workflow may also/alternatively automatically flag a medical device security issue by issuing an alert 324 (FIG. 3). A threat may be identified from a cyber-vulnerability score (e.g., as generated by the cyber-vulnerability scoring and threat modeling algorithm 310 (FIG. 3) exceeding a predetermined threshold), for which a validated and actionable response is available (e.g., as determined by a validated and actionable threat report 322 (FIG. 3). In response thereto, a user may manually submit a request to fix the security risk, or the system can automate the request to fix the security risk.

The remediation/mitigation workflow algorithm 400 comprises evaluating results at 402, of a vulnerability assessment. In an example implementation, a first stakeholder, e.g., a director of clinical engineering or equivalent (e.g., clinical change management board) reviews the evaluated results generated by dashboards and information produced by the system and which are presented in an electronic form in a browser, e.g., by reviewing results presented by the GUI 316 (FIG. 3).

The remediation/mitigation workflow algorithm 400 determines at 404 whether a security or vulnerability issue is present. If a security or vulnerability issue is present (YES), then the process continues to 406. In some embodiments, the first stakeholder may also optionally be required to approve an action to provide a security update at 406.

The remediation/mitigation workflow algorithm 400 then initiates a remediation/mitigation management workflow at 406 (where a vulnerability issue is detected). The remediation/mitigation workflow essentially creates and assigns tasks necessary to implement the approved security or vulnerability issue, deploys the security or vulnerability fix, tests and validates the fix, and further documents the fix.

Upon completing the remediation/mitigation management workflow at 406, a decision is made as to whether the vulnerability has been addressed at 408. If the vulnerability has been addressed (YES), the process continues to 410. Sometimes, e.g., due to device specific challenges, a patch or another control may not be implemented. Here, the decision (NO) may trigger a response to re-evaluate the results at 402, e.g., to try a different approach to address the device specific challenge that caused the remediation/mitigation to fail.

If the vulnerability has been addressed (YES), (or where no vulnerability issue is detected at 404, i.e., NO at 404), the remediation/mitigation workflow algorithm 400 recalculates the cyber-vulnerability scoring and threat modeling at 410. Recalculation can be performed, for instance, by recalculating the cyber-vulnerability scoring and threat modeling 310 (FIG. 3), by recalculating the cyber-vulnerability scoring by the cyber-vulnerability scoring component 216 (FIG. 2), updating the modeling by the threat modeling/monitoring component 220 (FIG. 2), etc. The process 400 loops back to evaluate results at 402 and the process continues. Here, there can be a delay or other intermediate process. Notably it is possible for numerous dynamic variables in the cyber-vulnerability scoring and threat modeling calculations that can change, which can trigger a need to perform a security or vulnerability fix. As such, this process loops indefinitely.

In an example implementation, the remediation/mitigation workflow algorithm identifies a second stakeholder (e.g., an internal team with appropriate technical skill set to deploy the software, such as a clinical engineering team for the organization). The remediation/mitigation management workflow at 406 also performs a functional and operational check of the device, and verifies that the network and system remain functional. The patch remediation/mitigation management workflow at 406 can also verify that clinical operations will not be adversely affected in view of the patch change.

In addition, tasks can be assigned to personnel with the appropriate training and level of responsibility to provide oversight and vulnerability management. Common job titles with the appropriate level of technical skillset and organizational responsibilities can include, but are not limited to, Director of Clinical Engineering, Clinical Engineer, Biomedical Equipment Technician, Network Engineer, Security Engineer, Application Administrator, Nurse Manager, Charge Nurse, Nursing Director, Risk Manager or Medical-IT Risk Manager, etc.

Remediation/Mitigation Workflow

In an example embodiment, such as illustrated in FIG. 4, the remediation/mitigation management workflow at 406 comprises identifying patches at 412. Once identified, a supervisor, e.g., Director of Clinical Engineering, directs the identified patches to be applied, e.g., by a stakeholder such as a team of Clinical Engineer/Biomed Technicians. Here, the director of Clinical Engineering, or person with relevant authority, can utilize considerations and evaluation parameters provided by medical device security research validation (see 304 of FIG. 3), and can utilize the GUI 316 of FIG. 3 to review relevant information associated with a relevant patch, such as update type, cyber-vulnerability score (risk associated with FDA classification, device, workflow, device usage and contingency), department location, number of devices, completion date, etc. Other considerations can include the expertise of the team assigned to deploy the patch (e.g., Biomed Technician device expertise), availability and support from clinical staff, etc.

The patch management workflow obtains the necessary patches at 414. For instance, the assignment of patches at 412 can supply the patch name, which is used to obtain the actual patch at 414. For instance, a Clinical Engineer/Biomed Technician can utilize the patch name provided by the remediation/mitigation management workflow at 406, which is vetted via the medical device security research validation (304 of FIG. 3) to obtain the applicable patch. As an illustrative example, a patch may be originated by an outside source, e.g., from an operating system or software developer (e.g., from the Microsoft Security Tech Center, Red Hat Product Security Center, NIST, etc.) or a medical device manufacturer.

The patch management workflow provides governance and traceability at 416 of verification and validation (V&V) testing. In an example embodiment, a Clinical Engineer/Biomed Technician will work with a Network Engineer and Clinical Staff to develop, via interaction with the GUI 316 (FIG. 3) a verification and validation plan. The verification and validation establish requirements, a test plan and recorded results. In this regard, the verification and validation plan considers factors such as device function, vulnerability mitigated by patch, operating environment, existing security controls and residual risk, etc. The remediation/mitigation management workflow 406, via the governance and traceability at 416, can also record requirements, store a devised test plan that will quantitatively measure the performance of the device to ensure requirements are met in the production environment, store the verification and validation test plan, store verification and validation results, etc.

The patch management workflow removes the corresponding medical device from service and applies the patch at 418.

The patch management workflow performs one or more tests at 420 after the patch has been installed. In some embodiments, the tests are performed at the device and system level to ensure that the patch update was carried out as anticipated. In an example implementation, tests can be performed in one or more manners. For instance, a clinical engineer/biomed technician tests the device after the patch has been applied, a clinical engineer/biomed technician verifies with an information technology engineer that the system and network remain functional after the patch update, a clinical engineer/biomed technician verifies with clinical staff that the device is operational, combinations of the above, etc. In an example implementation, a clinical engineer/biomed technician documents actions taken and updates the system, a clinical engineer/biomed technician performs and records verification and validation test plan results in the apparatus, or both, e.g., by interacting with the GUI 316 (FIG. 3).

The remediation/mitigation workflow also updates the system at 422 based upon the patch update. For instance, a vulnerability management update can be performed, such as by a clinical engineer/biomed technician providing updated information to the system, e.g., via the GUI (316 FIG. 3). Moreover, the remediation/mitigation management workflow 406, via the update at 422, can initiate a workflow and approval process with a healthcare delivery organization risk manager as a final approver. The remediation/mitigation management workflow 406, via the update at 422, can send a workflow to an assigned clinical staff, information technology staff, director of clinical engineering and risk manager. Here, several entities can review and approve one or more reports generated by the remediation/mitigation management workflow 406. For instance, device-level approval may be required by a clinical staff, network level approval may be required by network information technology staff, supervisor approval, e.g., from a director of a clinical engineering staff may be required, a risk manager approval may be required, combinations of the above may be required, etc.

Cyber-Vulnerability Scoring

Figure 5:
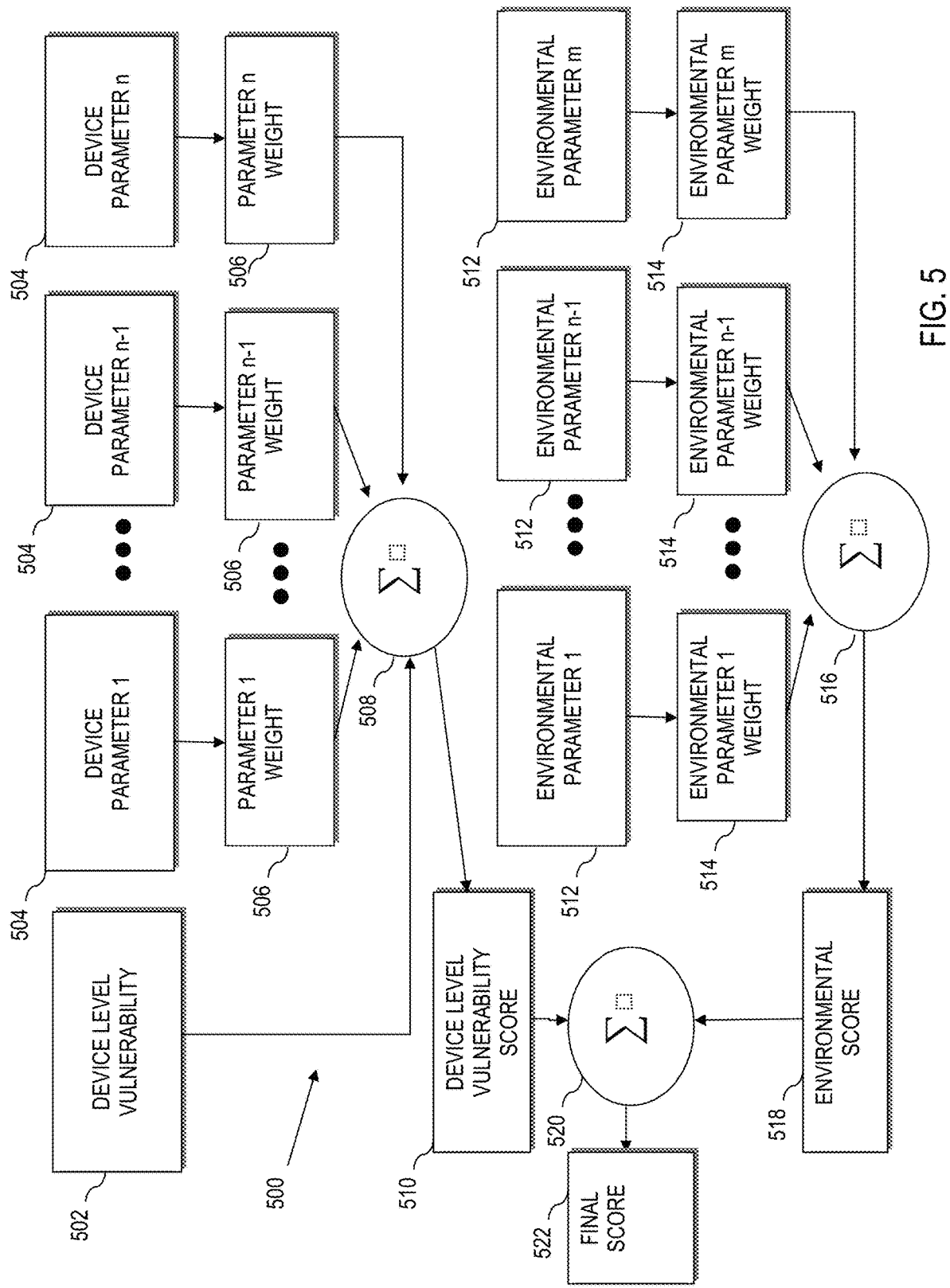
FIG. 5 is an example algorithm for scoring according to aspects herein.

Referring to FIG. 5, a cyber-vulnerability scoring algorithm 500 is illustrated, which may be used to drive the priority of devices addressed via the remediation/mitigation management and various workflows, i.e., the cyber-vulnerability scoring 216 (FIG. 2) and/or vulnerability scoring and threat modeling 310 (FIG. 3).

According to aspects of the present disclosure herein, the cyber-vulnerability scoring algorithm 500 is utilized to closely identify risk associated with an impact on a medical device, e.g., due to a compromise. The cyber-vulnerability scoring algorithm further assists in the prioritization, remediation/mitigation, or both, of those devices by the HDO. For instance, the cyber-vulnerability scoring 500 can evaluate every medical device (on an individual basis) affiliated with an HDO, and compute a cyber-vulnerability score for each medical device.

By way of illustration and not by way of limitation, the cyber-vulnerability scoring 500 may obtain, derive, compute, or otherwise generate a device level cyber-vulnerability score 502 for a particular instance of a medical device. As a few examples, the device level cyber-vulnerability score 502 may be derived from the medical device threat and vulnerability library 224 (FIG. 2); from device manufacturer resources 114 and/or third-party resources 118 (FIG. 1), etc. In some instances, there may be multiple sources for a device level cyber-vulnerability score 502. In this instance, the system can take the highest value, average the values, or perform any other desired processing to arrive at an overall device level cyber-vulnerability score 502.

The cyber-vulnerability scoring algorithm 500 also analyzes one or more device parameters 504 (e.g., 1-$n$) associated with the particular medical device being scored. In an example embodiment, such device parameters 504 can include device classification from the United States Food and Drug Administration (FDA); usage function; availability of and alternate support device; potential impact on patient care; open vulnerability; type of software; associated historic risk profile; network connectivity; device configuration (hardening); compensating controls in place; other relevant parameters, combinations thereof, etc.

In an example embodiment, each of the device parameters 504 is scaled using an associated weighting 506 that assesses a score for that device parameter 504. In some embodiments, the weightings 506 can be customized for the particular HDO, to set the associated weights based upon a priority of the associated device parameter 504 to affect a computed cyber-vulnerability score. The weighting can be user configured, preset, adjustable, dynamically adjusted, or otherwise established.

The device level cyber-vulnerability score 502 is considered along with the weighted device parameter(s) at 508 to derive a device level cyber-vulnerability score 510. The processing at 508 can be an aggregation, averaging, summation, or other defined function.

In addition to device level parameters 504, the cyber-vulnerability scoring algorithm 500 looks at environmental parameters 512 (e.g., 1-$n$). Example environmental parameters 512 include device usage; department criticality; device criticality; network exposure; other relevant parameters, combinations thereof, etc.

Each of the environmental parameters 512 is scaled using a corresponding weighting 514 that assesses a score for that environmental parameter 512. In some embodiments, the weightings 514 can be customized for the particular HDO, and are established based upon a priority of the associated environmental parameter 512 to affect the computed cyber-vulnerability score. The weighting can be user configured, preset, adjustable, dynamically adjusted, or otherwise established.

The weighted environmental parameters are considered at 516 to derive an environmental cyber-vulnerability score 518. The processing at 516 can be an aggregation, averaging, summation, or other defined function.

The device level cyber-vulnerability score 510 is combined with the environmental cyber-vulnerability score 518 at 520 to derive a final cyber-vulnerability score 522. Here, the device level cyber-vulnerability score 510 and the environmental cyber-vulnerability score 518 can be individually weighted, scaled, added, averaged, or otherwise processed to derive the final cyber-vulnerability score 522.

In some embodiments, instead of only considering device level vulnerabilities or network level exposures, a cyber-vulnerability score herein is derived from multiple parameters. Hence, the cyber-vulnerability score is a combination of cyber-vulnerability score (based on open vulnerabilities in the device) and environment cyber-vulnerability score. A final normalized cyber-vulnerability score is arrived at combining these scores. As such, this final cyber-vulnerability score 522 has the unique ability to closely identify potential risk posed by a device and help the HDO to prioritize remediation/mitigation action among the devices in the HDO. Cyber-vulnerability scoring is unique to the systems herein, e.g., in the way the scoring leverages operating parameters in an HDO to arrive at a normalized score for medical devices specific to the environment in which it is deployed.

EXAMPLE

Consider an example of a type of medical device, e.g., an infusion pump, which has multiple vulnerabilities published (e.g., based upon device manufacture resources 114 and/or third-party resources 116 (FIG. 1), with a maximum vulnerability (CVSS) score of 9.8 (out of 10). This maximum cyber-vulnerability score is declared the device cyber-vulnerability score 502. This score is then augmented using weighted device level parameters 504 (e.g., network exposure, contingency, etc.) to achieve a device level cyber-vulnerability score 510. Having a high cyber-vulnerability score means that the medical device is at a risk of exploitation and the HDO using that medical device incurs a high risk. Consider that there are numerous instances of these devices in the HDO.

Notably, all of the instances of this type of medical devices do not pose the same level of risk. Rather, the same medical device with same cyber-vulnerability score can have different cyber-vulnerability score based on where and for what it is used for.

To achieve this differentiation, unique to this solution, weighted environmental parameters are also considered. Here, the risk algorithm 500 effectively assigns an environmental cyber-vulnerability score 518 for each instance of this type of medical device (infusion pump in this example). Out of the numerous infusion pumps, if some are in operating room and some others are in dialysis clinics, they pose different risk. The environmental cyber-vulnerability score 518 is built using information like device criticality, department criticality, device usage, etc., as discussed above. Thus, as an example, the environmental risk score is built using information like device criticality, department criticality, device usage, etc.

A weighted sum of all these parameters are used to arrive at an environmental cyber-vulnerability score 518 for each instance of the infusion pump, which is then combined with (e.g., added) to the device level cyber-vulnerability score 510 to arrive at a final cyber-vulnerability score 522 for each instance of the infusion pump. This final cyber-vulnerability score 522 can be normalized (e.g., set to a base of 10) to arrive at a normalized cyber-vulnerability score (for example 8.2 out of 10). Thus, even though there may be dozens or hundreds of the same type of infusion pump at an HDO, each receives an individualized final cyber-vulnerability score.

Notably, since device level parameters 504 and environmental parameters 512 can be categorized based on those parameters impacting the likelihood of attack and those impacting resultant patient safety impact, the cyber-vulnerability scoring algorithm 500 can arrive at a comprehensive cyber-vulnerability score.

As such, in an example implementation, a likelihood (e.g., device vulnerability score, network exposure, physical exposure, usage data (whether currently in use, used sparingly, etc.) compensating controls, etc., can be collected. Also, patient impact data can be collected, e.g., device criticality, department criticality, contingency, device function (FDA class) utilization, etc., can be considered. Yet further, threat intelligence information (e.g., internal threat information, external threat information) etc., can be collected. The likelihood parameters, patient impact parameters, and threat intelligence can all be considered to derive the normalized risk score and prioritization.

Threat Modeling/Monitoring

As noted in greater detail herein, aspects hereof utilize threat modeling/monitoring (e.g., threat modeling/monitoring in the analysis and correlation engine 204, FIG. 2; cyber-vulnerability scoring and threat modeling 310, FIG. 3, etc.). In a practical implementation, threat modeling is used to augment the cyber-vulnerability scores to facilitate workflow and alerting functions, examples of which are described below.

In example implementations, one or more models can be utilized to assess threats. Here, the term "model" is used loosely and is not limited to a particular model form. Rather, different types of models can be combined to achieve the desired monitoring/modeling as the application dictates. As a few illustrative examples, the threat modeling can apply a combination of optimization modeling, deterministic modeling, adaptive modeling, combinations thereof, etc.

Regardless, the threat modeling works with the cyber-vulnerability scoring to set the prioritization, which in turn, drives the workflows and alerting.

Figure 6:
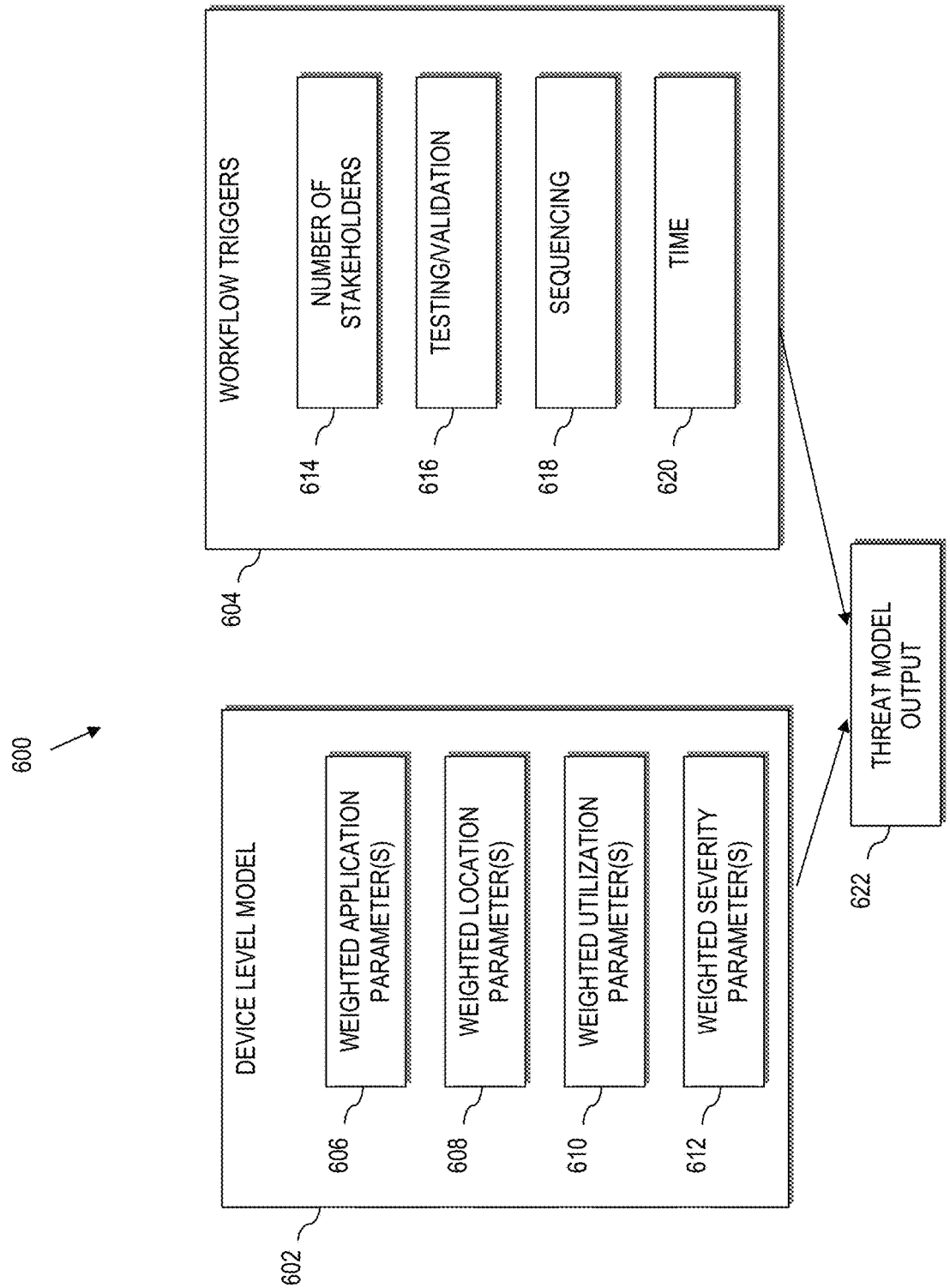
FIG. 6 is an example algorithm for implementing a threat model according to aspects herein.

Referring to FIG. 6, an example of a threat model 600 is illustrated according to aspects of the present disclosure herein. The threat model 600 balances two categories of information, including a device level risk model component 602 and a workflow trigger component 604 to prioritize remediation/mitigation of detected vulnerabilities.

The device level risk model component 602 balances parameters organized into categories, including an application category 606, a location category 608, a utilization category 610, and a severity category 612. Parameters are associated with each category. In this regard, parameters can be static, dynamic, probabilistic, etc.

In an example implementation, the threat modeling 600 considers, for each medical device associated with an HDO, its application category 606 in the context of treatment to patients, the context of how the medical device is used, whether device uses or needs a network connection, etc.

The location 608 balances and weights where in an HDO a device is located. For instance, a medical device in an intensive care unit may receive a higher model weighting than a similar medical device in a non-critical recovery room. Likewise, a heartrate monitor in an operating room may be weighted higher than a heartrate monitor in a wellness checkup room, etc.

The use category 610 weights utilization, such as whether the medical device in constant use or are there downtimes; whether there is a backup; whether availability of the device on demand is essential or optional, etc.

The severity category 612 weights the severity of a suspected vulnerability, e.g., known exploitations, known vulnerabilities, known failure situations, an exploitability index, etc.

Workflow triggers 604 weight the amount of work required to carry out a remediation/mitigation, assuming that a remediation/mitigation is carried out. In the illustrated example, the workflow triggers 604 evaluate for each medical device, the workload imposed by the associated remediation/mitigation. For instance, the workflow trigger can derive information based pulling a medical device from the medical device master catalog 222, using the medical device type to index into the medical device threat and vulnerability library 224 to identify a known issue (e.g., threat, vulnerability, security issue, etc.), then use the looked up issue and/or medical device type to index into the mitigative action data source 226 to identify a proper remediation/mitigation (See FIG. 2). Using the mitigative action returned from the query, the workflow trigger component 604 may optionally consult details about an associated HDO, e.g., by looking up the HDO in the HDO configuration 230. This provides detailed information about the structure, organization, requirement, etc. for remediation/mitigation that is particular to the HDO of interest, including testing and validation requirements, hierarchies, etc.

As illustrated in FIG. 6, an example implementation can utilize the workflow trigger component 604 to evaluate mitigation factors, such as the number of stakeholders 614 that are required to carry out a remediation/mitigation. For instance, if a patch requires substantive patchwork, e.g., at the device level, department level, network level, and administrative level, it is likely that different individuals will be required to oversee each level of the remediation/mitigation. Accordingly, it may be important to get started quickly to ensure that there is time to carry out the remediation/mitigation, and allow time for each stakeholder to carry out their job requirements. Thus, the threat model 600 may weight this vulnerability matter relatively high. Moreover, each stakeholder has its own queue of responsibilities, so the job has to be right-timed to ensure that there is no hang-up in the remediation/mitigation process. On the other hand, if the remediation/mitigation is merely changing a setting in a configuration, this may receive a different priority, as this type of remediation/mitigation is relatively straight forward. The above concepts can be expanded to account for the number of stakeholders that have to perform actions as part of the remediation/mitigation, the nature/duties of such stakeholders, etc.

In the illustrated implementation, the workflow triggers 604 also consider testing/validation 616 as a component of the model. For instance, the nature, stakeholders, and other details of verification and validation weigh in on the importance of a vulnerability remediation/mitigation. For instance, a remediation/mitigation with significant requirements for verification and validation may receive a different weight than a remediation/mitigation with less stringent verification and validation requirements.

The workflow triggers 604 further consider sequencing 618 to understand a precise order in which remediation/mitigation, verification, validation, or combinations thereof must be performed in order to successfully remediate a vulnerability of interest. For instance, it may be necessary to validate a remediation/mitigation such as a patch at the device level before validating that patch at the department or network level, etc.

The workflow triggers 604 can also consider an approximate time 620 to remediate in setting a priority. For instance, jobs that are complex require longer periods of time to carry forward. Such considerations are accounted for by the workflow triggers.

In practice, the threat modeling can also utilize data extracted from the HDO configuration 230 to understand resources available at an HDO. Here, by understanding realistic available resources, the threat modeling can seek to maximize remediation/mitigations by balancing cyber-vulnerability scores with the time and resources requirements to implement those remediation/mitigations. To this end, it may be in certain embodiments that certain remediation/mitigations of relatively lesser severity are processed before remediation/mitigations of relatively more sever resources due to the unavailability of necessary resources to carry out the remediation/mitigations.

A threat model output 622 is thus generated, which balances device level risks from the device level risk model component 602 with workflow triggers 604.

Prioritization

Prioritization is carried out for instance, by a scoring engine, e.g., implemented at part of the analysis and correlation engine 204 (FIG. 2) using the scoring logic (described above), where each medical device is given a normalized cyber-vulnerability score combining their cyber-vulnerability score and environmental cyber-vulnerability score. This facilitates HDOs to take a patient impact centric view of the device risk and prioritize remediation/mitigation based on that. In this regard, threat modeling leverages both internal and external threat intelligence to further prioritize devices for remediation/mitigation or protection. This is achieved by integrating with third-party sources third-party resources 116, FIG. 1) whereby threat intelligence is acquired and is correlated with the vulnerabilities impacting the devices in the medical device master catalog 222 (FIG. 2).

An analysis and correlation engine (e.g., 204 FIG. 2), functioning as a backend process, uses information from multiple sources to arrive at the appropriate cyber-vulnerability score and prioritization of the device. Thus, threat modeling, cyber-vulnerability scoring and prioritization are functions within the analysis and correlation engine, which then leads to alerting and workflow functions.

Workflow

Figure 7:
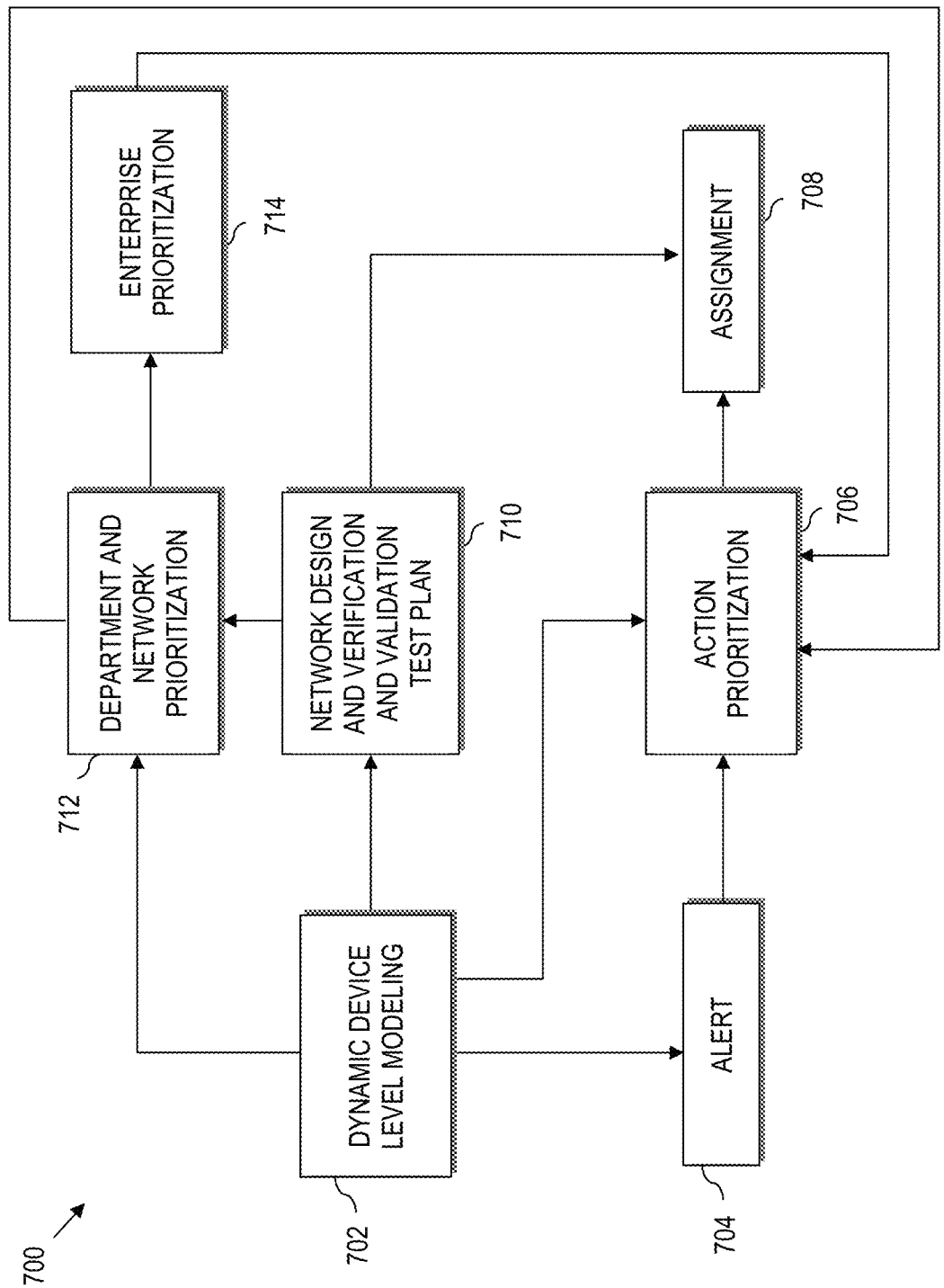
FIG. 7 is a flowchart illustrating an example workflow of a vulnerability management system according to aspects herein.

Referring to FIG. 7, a workflow 700 is provided for prioritizing the devices to be addressed. The workflow 700 can be implemented in the system 100, e.g., via the vulnerability management system 110 (FIG. 1); the management workflow 214 of the medical device vulnerability management system 200 (FIG. 2); the workflow engine 312 of the vulnerability management workflow 300 (FIG. 3), or combinations thereof.

The system generates dynamic device level modeling at 702. The dynamic device level modeling at 702 can be generated by the combination of cyber-vulnerability scoring 216 and threat modeling/monitoring 220 (FIG. 2); cyber-vulnerability scoring and threat modeling 310 (FIG. 3);

combination of cyber-vulnerability scoring algorithm (FIG. 5) and threat modeling algorithm (FIG. 6), or other suitable technique.

Keeping with the example algorithms of FIG. 5 and FIG. 6, the cyber-vulnerability scoring and threat modeling are driven by select parameters. In an example implementation, the dynamic device level modeling can comprise building models using static data, e.g., medical device class (I, II, III), $MDS^2$ data, etc.

The dynamic device level modeling can also consider changing but manageable parameters. Such parameters can comprise information pertaining to whether the network is connected, known open devices or sub-device level vulnerabilities, device utilization (e.g., frequency of use), contingency device availability, combinations thereof, etc.

The dynamic device level modeling can also consider probabilistic (usage-based) parameters, such as an operational device failure prediction, exploitability index, etc. Moreover, some parameters can be scaled, or otherwise manipulated. for instance, utilization can be expressed in hours; or low/medium/high; or other suitable scale where low may comprise <X hours/day (e.g., less than 1 hour per day); medium may comprise X-Y hours/day (e.g., 1-4 hours/day); and high may comprise >Y hours/day (e.g., greater than 4 hours/day). Likewise, contingency can be scaled, such as only 1 device (high), 1-2 devices (medium) >2 devices (low), etc.

In an example implementation, the dynamic device level modeling at 702 can output a prioritization of associated medical devices. In some example embodiments, the prioritization comprises relative device vulnerability scores, which can be normalized, e.g., to the lowest risk device. Thus, the devices are ranked by device priority, for their associated risk of a cyber-vulnerability.

The dynamic device level modeling at 702 may trigger alerts at 704, e.g., based upon parameters such as alerts from changing parameters, probabilistic parameters, combinations thereof, etc. The alerts at 704 trigger extraction of relevant data from a mitigative action database (e.g., mitigative action data source 226, FIG. 2), such as patch update modifications, anti-virus information, firewall information, policy information, training information, etc. The alerts at 704 can be based upon a cyber-vulnerability score or model criteria exceeding a benchmark, threshold or other measurable baseline, which can be predetermined, programmable, user-assignable, etc. In example embodiments, the alerts are displayed in a GUI, e.g., via the alerts section 324 of the GUI/Display 316 (FIG. 3).

In an example implementation, the alerting can include reporting of bottlenecks within the organization which is limiting the remediation/mitigation from being completed in a successful manner.

Either the output of the dynamic device level modeling 702 (e.g., based upon a relative device risk normalized to the lowest risk device prioritization), or the alerts at 704 can trigger an action prioritization engine at 706 to take action. In an example implementation, the action prioritization engine prioritizes patch updates relative to device risk. Moreover, the action prioritization engine at 706 can factor in data based upon a real-time location systems (RTLS) to compute a mean time to reach the affected device, time to mitigate the device issue, mean time to mitigate the device issue, etc. to prioritize actions.

The action prioritization engine at 706 outputs prioritized actions to an assignment engine 708. The assignment engine 708 affects assignments, and hence further refines priority based upon a number of assignment-related factors, such as the availability of a person (or team) to carry out the security fix, the efficiency of the person/team to carry out the security fix, the mean time to act, the delta from a personal average to a group average, an assignment of task per verification and validation based upon skill, availability, efficiency of a person, cross-functional resources, visibility of action on a GUI (web, mobile, voice-enabled), etc.

The dynamic device level modeling at 702 also outputs device profiles to network design verification and validation test plan generator 710 that generates a corresponding vulnerability and validation test plan, as described more fully herein. The network design verification and validation test plan generator also drives the assignment engine, e.g., by providing a suitable verification and validation plan, etc.

The workflow 700 can also include a dynamic department and/or network level risk prioritization engine 712. As illustrated, dynamic department prioritization and network prioritization are organized into a single process for convenience of illustration. However, in practice, the department prioritization can be separate from network prioritization, there may not be a need for department level prioritization, etc., e.g., depending upon the organizational structure of the corresponding HDO.

The dynamic department and network level risk prioritization engine 712 receives inputs from the dynamic device level modeling at 702, such as a relative device risk (e.g., normalized to the lowest risk device), a prioritization, alerts from changing parameters and probabilistic parameters, etc. The dynamic department and network level prioritization engine 712 also receives inputs from the network design verification and validation test plan generator 710, such as network exploitability, index (risk), etc., from the verification and validation test plan generated thereby.

The dynamic department and network level risk prioritization engine 712 processes department risk parameters such as a relative device risk, quantity of devices, relative department utilization, patient risk (electronic health record data and health safety information), etc. The dynamic department and network level risk prioritization engine 712 also processes predictive network risk, such as a network FME from a device, a failure prediction, exploitability index, etc.

In some embodiments, dynamic department prioritization, dynamic network level prioritization, a combination thereof, etc., also feeds an output to the action prioritization 706. This enables re-prioritization of the medical devices based upon department, network, etc. For instance, in certain embodiments, an HDO may have two or more instances of the same medical device type. The various instances may have the same medical device score. However, one instance of the medical device may be in a high priority department, e.g., surgical room, whereas another instance is located in a less important area, e.g., storage. Moreover, devices on certain networks, e.g., intensive care, may be prioritized over like medical device types in less critical applications, e.g., wellness checkup rooms. The above, is by way of example and not by way of limitation.

The workflow 700 still may also optionally comprise a dynamic enterprise level prioritization that receives as input from the dynamic department and network level prioritization engine 712, input parameters that can include relative device department data (e.g., normalized to the lowest risk device), prioritization data, etc. The dynamic enterprise level risk prioritization at 712 can consider enterprise risk and liability potential, such as patient risk exposure, likely cost per adverse event, likely cost for a record breach, insurance coverage limits, etc.

In certain embodiments, the dynamic enterprise level prioritization feeds an output to the action prioritization 706. Analogous to the above discussion, this enables re-prioritization of the medical devices based upon enterprise level considerations. For instance, some HDOs may be multiple, distinct, physical facilities, each of which operates its own network. In some embodiments, medical devices at a particular enterprise level can be prioritized over like devices in a less critical enterprise level facility. For instance, medical devices at a mass casualty triage center may prioritize over like medical devices in a clinic, etc. Again, the above are exemplary only.

Miscellaneous

The apparatus or system addresses many challenges directed to medical device security. The system contains the following, but is not limited to features that provide a centralized electronic medium for aggregating vulnerability information, patch information and other best practices related to medical devices; facilitates visibility of security patch and other vulnerability information and act as an electronic repository between the medical device manufacturer and medical device users (HDOs such as hospitals and other healthcare delivery organizations); provides an electronic methodology to input medical device inventory of HDO into the system and facilitate analysis of the inventory in comparison to the data in the electronic repository to provide risk analysis and prioritized recommendations; provides a workflow driven process to facilitate vulnerability management of medical devices by tracking the process from identification of vulnerabilities, associated patches/fixes, and guiding the healthcare organization stakeholders through the process; provides a methodology to evaluate medical device risk during the acquisition process leveraging the electronic repository of risk data;

One or more embodiments herein can also contain the following ability to: provide a methodology to assign a cyber-vulnerability score to medical devices based on vulnerabilities, threats, compensating controls, usage and other relevant parameters such as hospital operating procedures, device inventory, Clinical IT configuration, etc.

Embodiments can provide an electronic mechanism to share alerts, reports and other relevant information to support vulnerability management process.

Yet further, embodiments provide an electronic mechanism to verify available patch and other vulnerability information for medical devices, identify approved and unapproved patches as well as other vulnerabilities there by facilitating conversation between healthcare delivery organizations and medical device manufacturers on patch approvals; creates an electronic apparatus to distribute, display or access workflow reports and other information created as described above using web browsers and mobile device applications. Such may include assigning, tracking and controlling via electronic signatures of all tasks as part of workflow and governance processes.

Some embodiments may include other components relevant to the vulnerability management workflow, and/or improve efficiency and reduce cost for healthcare delivery organizations in performing the vulnerability management of medical devices on standalone basis or as part of the Clinical IT network. Also, some embodiments promote medical device security and facilitate improvements patient safety practices related to medical devices. This is achieved by a method, system and electronic repository for aggregating, reviewing, validating and maintaining the security vulnerability and patch information of medical devices.

In an example embodiment, a method comprises of the following: means to electronically gather medical device information from sources like medical device manufacturers and other trusted sources like FDA1; means to electronically gather vulnerability and patch information from medical device manufacturers and other trusted sources like ICS-CERT, ECRI and other relevant sources; means of electronically centralizing the gathered information into a repository which can be utilized as a single source to support medical device vulnerability management; means to analyze the gathered data based on security research and augment additional parameters to be leveraged by the HDO's; and means to electronically and manually gather inventory of medical devices from healthcare facilities and correlating them with the available data.

Furthermore, in some embodiments, a system comprises a computer software program to electronically calculate a base cyber-vulnerability score for each medical device based on known threats and vulnerabilities, and a normalized cyber-vulnerability score weighed based on device usage, implementation specifics, compensating controls and other HDO specific environmental factors.

Furthermore, in some embodiments, a system comprises a computer software program for creating a workflow for identifying vulnerable devices, available patches and fixes, prioritizing the fixes, facilitating approvals by relevant stakeholders and tracking the installation of the fixes.

Furthermore, some embodiments comprise a computer software program that generates dashboards and reports facilitating medical device risk visibility for various HDO administrators and technologists including executives, clinical technicians and other stakeholders. The system comprises of following methods: means to electronically display a dashboard of vulnerability status of medical devices with multiple views like whole organization, specific departments, specific type of devices and other required groupings; means to electronically generate, transmit and store report of available patches, vulnerable devices and other information in the central repository with different views as required by the staff.

Furthermore, some embodiments comprise a computer software program to generate alerts based on defined criteria to information hospital staffs of new vulnerably, patches and associated risks.

Furthermore, some embodiments comprise a computer-readable medium embodying computer program comprises code segments to control a general-purpose computer and/or mobile computing device to perform the method of this system.

Example Flow

Figure 8:
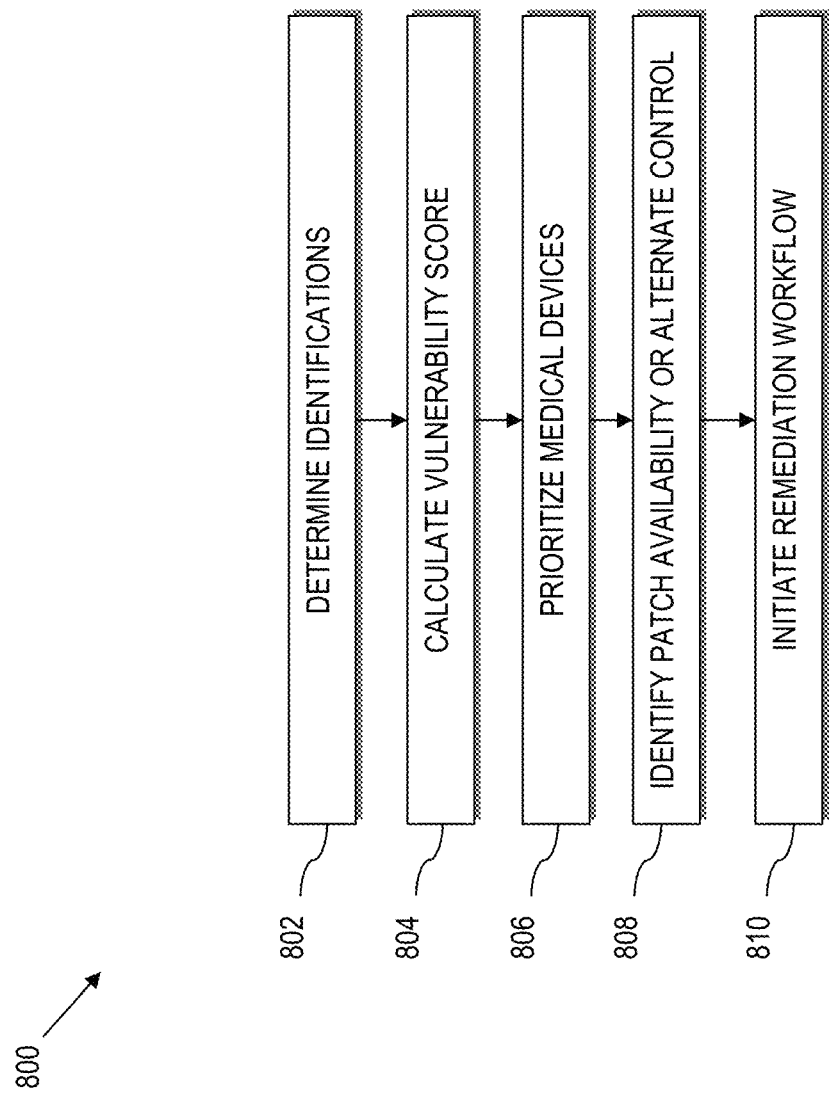
FIG. 8 is a flowchart illustrating an example computer-implemented process of remediating or at least mitigating device security vulnerabilities, according to aspects herein.

Referring to FIG. 8, computer-implemented process 800 of remediating medical device security vulnerabilities is provided. The computer-implemented process 800 comprises determining at 802, identifications of electronic medical devices associated with an entity. By way of example, determining at 802 can be carried out by querying a medical device central data source that stores at least one of device make, model, platform version, an inventory of software and software versions, operating system, operating system versions, service pack version, validated patch, and validated patch version.

The computer-implemented process 800 also comprises calculating at 804, for each medical device, a security cyber-vulnerability score (e.g., final score 522, FIG. 5). By way of non-limiting example calculating, for each medical device, a security cyber-vulnerability score can be carried out by generating a device cyber-vulnerability score based upon known threats and vulnerabilities, generating a device level cyber-vulnerability score by augmenting the generated device cyber-vulnerability score based upon at least one device level parameter, generating an environmental cyber-vulnerability score, and computing an overall cyber-vulnerability score based upon the device level cyber-vulnerability score and the environmental cyber-vulnerability score. An example of such an approach is described with reference to FIG. 5.

In some embodiments, computing an overall cyber-vulnerability score further comprises computing a normalized environmental cyber-vulnerability score that is weighed based on at least one of device usage, device implementation, compensating controls, and a predetermined environmental factor.

Also, in certain embodiments, generating a device level cyber-vulnerability score further comprises assigning a cyber-vulnerability score to each medical device based upon at least one of vulnerabilities, threats, compensating controls, usage, hospital operating procedures, device inventory, and a clinical information technology configuration.

The computer-implemented process 800 also comprises prioritizing at 806, the electronic medical devices based upon the computed overall cyber-vulnerability score for each medical device. Prioritization can be carried out as set out in greater detail herein, e.g., as discussed with reference to FIG. 7.

Also, the computer-implemented process 800 comprises identifying at 808, whether a patch is available for at least one electronic medical device.

Moreover, the computer-implemented process 800 comprises initiating at 810, a remediation/mitigation workflow (e.g., as described with reference to FIG. 4) to patch each identified electronic medical device based upon determining that the identified medical device has a high priority and determining that a patch is available for that medical device.

The computer-implemented process 800 can also include additional processes, such as providing a central threat and vulnerability data source that stores threat and vulnerability information for the electronic medical devices stored in the medical device central data source, querying a manufacturer server to pull updated information about electronic medical devices into the medical device central data source, and querying at least one threat and vulnerability publishing entity to gather, normalize and store threat and vulnerability data into the central threat and vulnerability data source. Here, generating a device cyber-vulnerability score can be implemented by computing the device cyber-vulnerability score based upon information associated with the medical device that is queried from the medical device central data source threat and vulnerability data source.

Also, the computer-implemented process 800 can also include additional processes, such as generating an alert based upon defined criteria that communicates new vulnerably, patches and associated risks, outputting a risk analysis and prioritized recommendations to patch at least one electronic medical device, etc.

Still further, the computer-implemented process 800 can also include additional processes, such as utilizing a workflow driven process to facilitate vulnerability management of the electronic medical devices by tracking the process from identification of vulnerabilities, associated patches, and guiding corresponding healthcare organization stakeholders through the workflow driven process to facilitate vulnerability management.

In some embodiments, the computer-implemented process 800 can also include additional processes, such as verifying available patch information for the electronic medical devices, verifying available vulnerability information for the electronic medical devices, identifying approved and unapproved patches thereby facilitating conversation between healthcare delivery organizations and medical device manufacturers on patch approvals, combinations thereof, etc.

The computer-implemented process 800 can also further comprise providing a centralized data source that stores patch information, wherein identifying whether a patch is available for at least one electronic medical device comprises querying the centralized data source to identify whether a patch is available for the electronic medical device.

In some implementations, the computer-implemented process 800 also comprises assigning, tracking and controlling via electronic signatures of all tasks as part of the remediation/mitigation workflow.

Moreover, in some implementations, the computer-implemented process 800 further comprises gathering electronically, medical device information from a medical device manufacturer, and gathering electronically, vulnerability and patch information from the medical device manufacturer.

In some embodiments, generating a dashboard that electronically displays a vulnerability status of medical devices, integrating into the dashboard, navigable elements that enable a user to drive through multiple views, including a whole organization view, a specific department view, a specific type of electronic medical device view, writing to a central repository, at least one report of available patches, and vulnerable devices, combinations thereof, etc. Thus, for instance, a user browsing the generated dashboard can trigger further processes, comprising initiating a patch management workflow, deploying a software update, verifying functional and operational checks on the updated electronic medical device, providing governance and traceability of the verified functional and operational checks, combinations thereof, etc.

Although described in the context of medical devices, this system can be adapted to all devices that are networkable or otherwise susceptible to cyber-attacks/vulnerabilities. For instance, the system and processes herein can be applied to other industries and end operational devices such as boilers in a chemical plant, aircraft engine controls in aviation, etc.

Example Computer System

Figure 9:
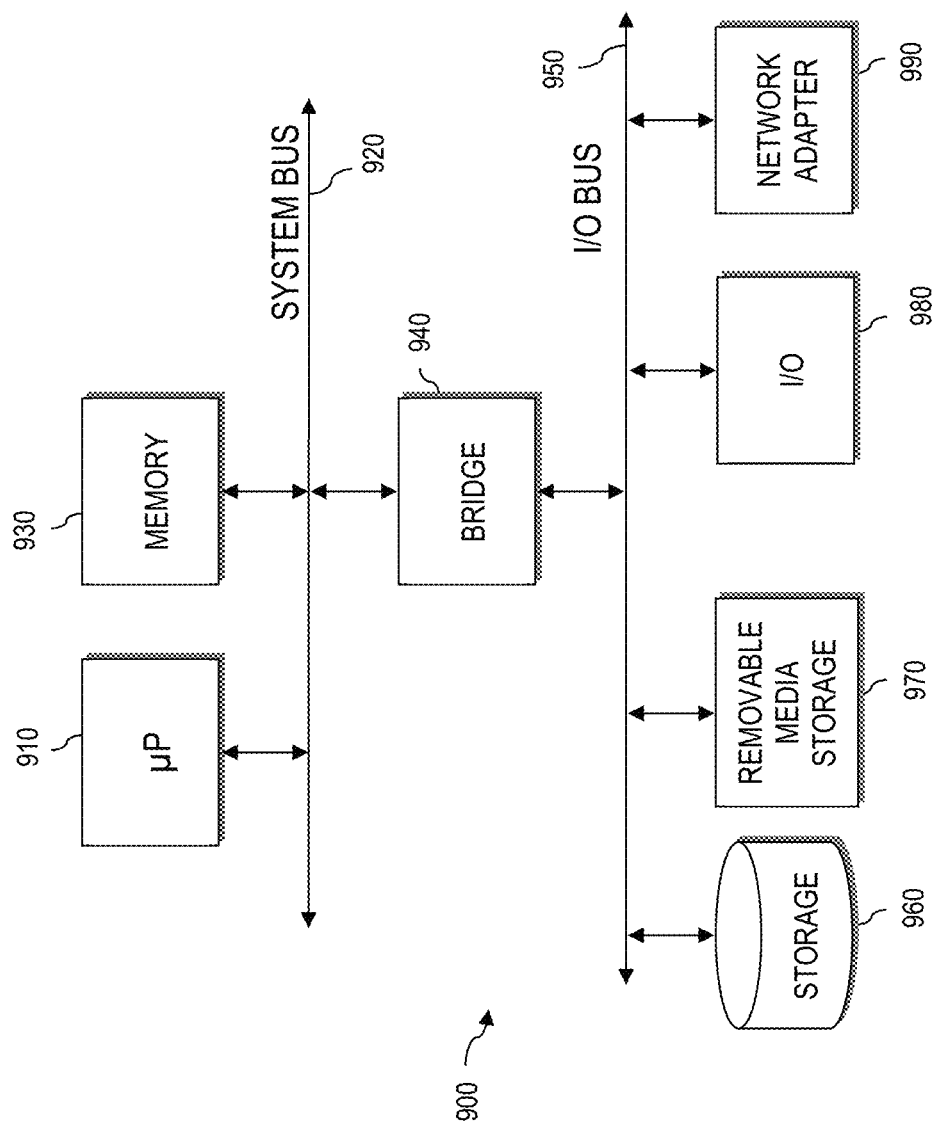
FIG. 9 is a block diagram of a computer system having a computer readable storage medium for implementing functions according to various aspects of the present disclosure as described in greater detail herein.

Referring to FIG. 9, a block diagram of a hardware data processing system is depicted in accordance with the present disclosure. Data processing system 900 may comprise a symmetric multiprocessor (SMP) system or other configuration including a plurality of processors 910 connected to system bus 920. Alternatively, a single processor 910 may be employed. Also connected to the system bus 920 is local memory 1030. An I/O bus bridge 940 interfaces the system bus 920 to an I/O bus 950. The I/O bus 950 is utilized to support one or more buses and corresponding devices, such as storage 960, removable media storage 970, input/output devices 980, network adapters 990, other devices, combinations thereof, etc. For instance, a network adapter 990 can be used to enable the data processing system 900 to communicate with other data processing systems or remote printers or storage devices through intervening private or public networks.

The memory 930, storage 960, removable media storage 970, or combinations thereof can be used to store program code that is executed by the processor(s) 910 to implement any aspect of the present disclosure described and illustrated in FIGS. 1-8.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but not limited to, a portable computer diskette, a hard disk, a random access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction execution system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented process of remediating a device vulnerability for a particular special-purpose electronic medical device in a particular healthcare delivery organization (HDO), the process comprising:
   determining an identification of the particular special-purpose electronic medical device in the particular HDO;
   generating a device cyber-vulnerability score based upon known threats and vulnerabilities affecting a type of product to which the special-purpose electronic medical device pertains;
   generating a device level cyber-vulnerability score by augmenting the generated device cyber-vulnerability score based upon a device level parameter that is specific to the special-purpose electronic medical device;
   generating an environmental cyber-vulnerability score based on a weighted combination of usage of the special-purpose electronic medical device in the particular HDO, including medical condition information of a patient the particular special-purpose electronic medical device may be used on and including determining an indicia of medical impact to the patient based on the medical condition information, criticality of the special-purpose electronic medical device, and network exposure of the special-purpose electronic medical device in the particular HDO;
   computing an overall cyber-vulnerability score based upon a combination of the device-level cyber-vulnerability score and the environmental cyber-vulnerability score;
   determining whether the special-purpose electronic medical device has a high priority based upon the computed overall cyber-vulnerability score;
   identifying whether a patch or other vulnerability remediation is available for the special-purpose electronic medical device; and
   initiating, in response to identifying that the patch or other vulnerability remediation is available and in response to determining that the special-purpose, electronic medical device has a high priority, a remediation/mitigation workflow to patch or remediate the special-purpose electronic medical device.

2. The computer-implemented process of claim 1, wherein:
   determining the identification of the special-purpose electronic medical device comprises:
      querying a device central data source that stores at least one of device make, model, platform version, an inventory of software and software versions, operating system, operating system versions, service pack version, validated patch, and validated patch version.

3. The computer-implemented process of claim 2 further comprising:
   providing a central threat and vulnerability data source that stores threat and vulnerability information for the electronic devices stored in the device central data source;
   querying a manufacturer server to pull updated information about electronic devices into the device central data source; and
   querying at least one threat and vulnerability publishing entity to gather, normalize, and store threat and vulnerability data into the central threat and vulnerability data source as part of the threat and vulnerability information for the electronic devices stored in the device central data source.

4. The computer-implemented process of claim 3, wherein:
   generating the device cyber-vulnerability score comprises computing the device cyber-vulnerability score based upon information associated with a device that is queried from the device central data source as well as threat and vulnerability data source.

5. The computer-implemented process of claim 3 further comprising:
   providing a centralized data source that stores patch or other vulnerability remediation information;
   wherein:
      identifying whether the patch or other vulnerability remediation is available comprises querying the centralized data source to identify whether the patch or other vulnerability remediation information is available for the special-purpose electronic medical device.

6. The computer-implemented process of claim 1, wherein:
   computing the overall cyber-vulnerability score further comprises:
      computing a normalized environmental cyber-vulnerability score that is weighed based on at least one of usage of the special-purpose electronic medical device, implementation of the special-purpose electronic medical device, compensating controls, utilization of the special-purpose electronic medical device, department criticality, and a predetermined environmental factor.

7. The computer-implemented process of claim 1, wherein:
   generating the device level cyber-vulnerability score further comprises assigning the cyber-vulnerability score to the special-purpose electronic medical device based upon at least one of vulnerabilities, threats, compensating controls, usage of the special-purpose electronic medical device, hospital operating procedures, device inventory, and a clinical information technology configuration.

8. The computer-implemented process of claim 1 further comprising:
   generating a normalized cyber-vulnerability score for the special-purpose electronic medical device based on the device level cyber-vulnerability score and the environmental cyber-vulnerability score providing an equitable cyber-vulnerability score to facilitate prioritization.

9. The computer-implemented process of claim 1 further comprising generating an alert based upon defined criteria that communicates new vulnerability, patches and associated vulnerabilities.

10. The computer-implemented process of claim 1 further comprising outputting a vulnerability analysis and prioritized recommendations to patch or take remediation/mitigation action on special-purpose electronic medical device.

11. The computer-implemented process of claim 1 further comprising querying a patient management system to pull electronic devices used for patient treatment for:
   evaluating patient safety impact of using the special-purpose electronic medical device, and alerting clinical personal of device vulnerability supporting clinical decision.

12. The computer-implemented process of claim 1 further comprising:
   verifying available patch information for the special-purpose electronic medical device;
   verifying available vulnerability information for the special-purpose electronic medical device; and
   identifying approved and unapproved patches thereby facilitating conversation between the HDO and device manufacturers on patch approvals.

13. The computer-implemented process of claim 1 further comprising:
   gathering, electronically, medical device information at least from a device manufacturer; and
   gathering, electronically, vulnerability and patch or other vulnerability remediation information from the device manufacturer.

14. The computer-implemented process of claim 1 further comprising:
   generating a dashboard that electronically displays a vulnerability status of the special-purpose electronic medical device;
   integrating, into the dashboard, navigable elements that enable a user to drive through multiple views, including a whole organization view, a specific department view, and a specific type of electronic device view;
   writing, to a central repository, at least one report of available patches, and vulnerable devices.

15. The computer-implemented process of claim 14, wherein upon the user browsing the generated dashboard:
   initiating a remediation/mitigation workflow;
   deploying a software update to update the special-purpose electronic medical device;
   performing a remediation/mitigation action;
   verifying functional and operational checks on the updated special-purpose electronic medical device; and
   providing governance and traceability of the verified functional and operational checks.

16. The computer-implemented process of claim 1, wherein the medical condition information is selected from the group consisting of:
   device criticality;
   department criticality;
   contingency; and
   device function (FDA class) utilization.

* * * * *

UNITED STATES PATENT AND TRADEMARK OFFICE
CERTIFICATE OF CORRECTION

PATENT NO. : 10,992,698 B2  
APPLICATION NO. : 15/897535  
DATED : April 27, 2021  
INVENTOR(S) : Pranav N. Patel et al.

Page 1 of 1

It is certified that error appears in the above-identified patent and that said Letters Patent is hereby corrected as shown below:

In the Claims

Column 29, Line 44, in Claim 1, "remediation is available" should read --remediation is available,--; and Column 29, Line 45, in Claim 1, "the special-purpose, electronic" should read --the special-purpose electronic--.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*